US012703799B2

(12) United States Patent
Futamata et al.

(10) Patent No.: US 12,703,799 B2
(45) Date of Patent: Aug. 11, 2026

(54) COMPOSITION FOR FORMING COLORED LAYER, OPTICAL FILM, AND DISPLAY DEVICE

(71) Applicant: TOPPAN INC., Tokyo (JP)

(72) Inventors: Kai Futamata, Tokyo (JP); Yoshiko Ishimaru, Tokyo (JP); Takenori Goda, Tokyo (JP); Shigeki Furukawa, Tokyo (JP); Hanae Tagami, Tokyo (JP)

(73) Assignee: TOPPAN INC., Tokyo (JP)

( * ) Notice: Subject to any disclaimer, the term of this patent is extended or adjusted under 35 U.S.C. 154(b) by 157 days.

(21) Appl. No.: 18/440,204

(22) Filed: Feb. 13, 2024

(65) Prior Publication Data

US 2024/0199889 A1 Jun. 20, 2024

Related U.S. Application Data

(63) Continuation of application No. PCT/JP2022/031140, filed on Aug. 17, 2022.

(30) Foreign Application Priority Data

Aug. 17, 2021 (JP) ................................ 2021-132535
Jan. 14, 2022 (JP) ................................ 2022-004645
Jan. 14, 2022 (JP) ................................ 2022-004646

(51) Int. Cl.

*C08F 2/46* (2006.01)
*C08F 2/50* (2006.01)
*C08G 61/04* (2006.01)
*C09D 4/06* (2006.01)
*C09D 5/00* (2006.01)
*C09D 5/16* (2006.01)
*C09D 7/41* (2018.01)
*C09D 135/02* (2006.01)
*G02B 5/22* (2006.01)

(52) U.S. Cl.

CPC ............... *C09D 4/06* (2013.01); *C09D 5/006* (2013.01); *C09D 5/16* (2013.01); *C09D 7/41* (2018.01); *C09D 135/02* (2013.01); *G02B 5/223* (2013.01)

(58) Field of Classification Search

CPC .......... G02B 1/113; G02B 5/223; C09D 7/61; C09D 7/41; C09D 135/02; C09D 5/006; C09D 5/16; C09D 4/06; C08F 5/0041; C08F 5/0025; C08J 7/048; C08J 7/042; C08J 7/046; C08J 2433/12; C08J 2433/06; C08J 2333/12; C08J 2301/12; C08J 2429/04; C08J 2367/02; G09F 9/30; H10K 50/86; C08L 33/12; C08L 23/10
USPC ...................... 522/71, 1, 189, 184, 6; 520/1
See application file for complete search history.

(56) References Cited

U.S. PATENT DOCUMENTS

2011/0024780 A1 2/2011 Park et al.
2025/0059388 A1* 2/2025 Futamata .............. H10K 59/10

FOREIGN PATENT DOCUMENTS

JP 2007-226239 A 9/2007
JP 2011-141356 A 7/2011
JP 2011253174 A * 12/2011
JP 2014-041322 A 3/2014
JP 5673713 B2 2/2015
JP 6142398 B2 6/2017
JP 2019-056865 A 4/2019
KR 1020190132403 A 11/2019
WO WO-2022158007 A1 * 7/2022 ............ G02B 5/223

OTHER PUBLICATIONS

Satake et al, JP 2011253174 Machine Translation, Dec. 15, 2011 (Year: 2011).*
Ishimaru et al, WO 2022158007 Machine Translation, Jul. 28, 2022 (Year: 2022).*
International Searching Authority, "International Search Report," issued in connection with International Patent Application No. PCT/JP2022/031140, dated Nov. 8, 2022.
International Searching Authority, "Written Opinion," issued in connection with International Patent Application No. PCT/JP2022/031140, dated Nov. 8, 2022.
Office Action issued in corresponding Korean Patent Application No. 10-2024-7004456 dated Jan. 30, 2026.

* cited by examiner

*Primary Examiner* — Jessica Whiteley
(74) *Attorney, Agent, or Firm* — Benjamin A. Berkowitz; Poley & Lardner LLP

(57) ABSTRACT

A composition for forming a colored layer includes a dye, an ionizing radiation-curable resin, a photoinitiator, and a solvent. The dye contains a first colorant and a second colorant, the first colorant has a wavelength of maximum absorption in a range of 470 nm to 530 nm, and an absorption spectrum with a full width at half maximum of 15 nm to 45 nm, the second colorant has a wavelength of maximum absorption in a range of 560 nm to 620 nm, and an absorption spectrum with a full width at half maximum of 15 nm to 55 nm, and the ionizing radiation-curable resin contains a resin having an amine structure.

21 Claims, 5 Drawing Sheets

COMPOSITION FOR FORMING COLORED LAYER, OPTICAL FILM, AND DISPLAY DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/031140, filed on Aug. 17, 2022, which is based upon and claims the benefit to Japanese Patent Application No. 2021-132535 filed on Aug. 17, 2021, Japanese Patent Application No. 2022-004645 filed on Jan. 14, 2022, and Japanese Patent Application No. 2022-004646 filed on Jan. 14, 2022, the disclosures of which are incorporated herein by reference in their entirety.

TECHNICAL FIELD

The present invention relates to a composition for forming a colored layer, an optical film and a display device.

BACKGROUND

Display devices are often used in environments where there is incident external light, whether indoors or outdoors. The external light incident on the display device is reflected at the surface of the display device, causing a reduction in display quality. In particular, self-emissive display devices such as organic light emitting display devices have the problem that the electrodes and many other metal wirings strongly reflect external light, which tends to degrade display quality. However, they are expected to provide next-generation display devices due to their high quality characteristics such as the ability to reduce size, low power consumption, high luminance, and high response speed.

Configurations are known in which a polarizing plate and a retarder are placed on the display surface side to suppress reflection of external light and thereby solve the problem of drop in display quality due to reflection of external light.

However, in the method using a polarizing plate and a retarder, when light from the display device passes through the polarizing plate and retarder and is emitted externally, a considerable portion of the light is lost. This tends to reduce the lifespan of the device.

In addition, display devices are generally required to have high color purity. Color purity indicates the range of colors a display device can display, and is also called color reproduction range. Therefore, high color purity means a wide color reproduction range and good color reproducibility. Known means of improving color reproducibility include a method in which a color filter for separating colors is applied to a light source that emits white light, and a method in which a color filter for correction is applied to light sources that emit monochromatic light of the three primary colors RGB in order to narrow down the full width at half maximum. However, when a color filter is used to improve the color reproducibility of a display device, it is necessary to make the color filters thicker and increase the concentration of colorants. This may cause deterioration of pixel shape and viewing angle characteristics, resulting in poor display quality. Further, color filters with improved color purity generally have low transmittance and tend to reduce luminance efficiency. With regard to display devices that emit monochromatic light of the three primary colors RGB, a step of forming a color filter is required, which increases the cost.

As an alternative to the above-mentioned configuration provided with a polarizing plate and a retarder or a configuration having a color filter, PTL 1 proposes an organic light emitting display device having a display substrate including organic light-emitting elements and a sealing substrate disposed apart from the display substrate. A filler is embedded in the space between the display substrate and the sealing substrate to adjust the transmittance by selectively absorbing external light in a specific wavelength band. According to the invention of PTL 1, in addition to the improvement in visibility achieved by suppressing external light reflection, color purity is improved because the portion of the light emitted from the display device that is in a wavelength band that particularly reduces color purity is selectively absorbed.

As a method of improving color purity without using a color filter, PTL 2 discloses a display filter in which a color correction layer is provided on a filter base having an antireflection layer and an electromagnetic wave shielding layer. Since this display filter has a configuration in which a color correction layer is provided on an antireflection film, a photolithography process is not required in manufacturing, and luminance efficiency is less likely to decrease.

PTL 3 discloses a colorant suitable for the color correction layer.

CITATION LIST

Patent Literature

PTL 1: JP 5673713 B; PTL 2: JP 2007-226239 A; PTL 3: JP 6142398 B.

SUMMARY OF THE INVENTION

Technical Problem

However, dyes with selective absorption properties such as those used in the techniques disclosed in PTL 1, 2, and 3 have flaws including low lightfastness and heat resistance. The products cannot ensure sufficient reliability, and it is difficult to put them into practical use unless their reliability is improved.

In view of the above circumstances, the present invention aims to provide a composition for forming a colored layer capable of improving lightfastness and heat resistance, achieving both reflection suppression and luminance efficiency, improving display quality, extending the life of light-emitting elements, and improving color reproducibility, and a composition for forming a colored layer, an optical film, and a display device having a good color correction function and capable of withstanding long-term use.

Solution to Problem

The present invention has the following aspects.

A composition for forming a colored layer according to a first aspect of the present invention contains a dye (A), an ionizing radiation-curable resin (B), a photoinitiator (C), and a solvent (D). The dye (A) contains a first colorant and a second colorant, the first colorant has a wavelength of maximum absorption in a range of 470 nm to 530 nm, and an absorption spectrum with a full width at half maximum of 15 nm to 45 nm, the second colorant has a wavelength of maximum absorption in a range of 560 nm to 620 nm, and an absorption spectrum with a full width at half maximum of 15 nm to 55 nm, and the ionizing radiation-curable resin (B) contains a resin having an amine structure.

According to a composition for forming a colored layer according to a second aspect of the present invention, in the first aspect, the ionizing radiation-curable resin (B) may be a polymer containing a structural unit represented by following formula (1),

[Chemical Formula 1]

(1)

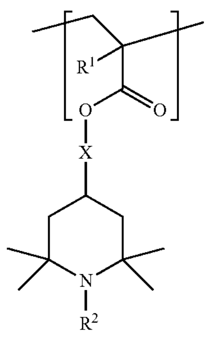

[where $R^1$ represents a hydrogen atom, halogen atom, carboxyl group, sulfo group, cyano group, hydroxy group, alkyl group having 10 or fewer carbon atoms, alkoxycarbonyl group having 10 or fewer carbon atoms, alkylsulfonylaminocarbonyl group having 10 or fewer carbon atoms, arylsulfonylaminocarbonyl group, alkylsulfonyl group, arylsulfonyl group, acylaminosulfonyl group having 10 or fewer carbon atoms, alkoxy group having 10 or fewer carbon atoms, alkylthio group having 10 or fewer carbon atoms, aryloxy group having 10 or fewer carbon atoms, nitro group, alkoxycarbonyloxy group, aryloxycarbonyloxy group, acyloxy group having 10 or fewer carbon atoms, acyl group having 10 or fewer carbon atoms, carbamoyl group, sulfamoyl group, aryl group having 10 or fewer carbon atoms, substituted amino group, substituted ureido group, substituted phosphono group, or a heterocyclic group; $R^2$ represents a hydrogen atom or an alkyl group having 30 or fewer carbon atoms; and X represents a single bond, an ester group, an aliphatic alkyl chain having 30 or fewer carbon atoms, an aromatic chain, a polyethylene glycol chain, or a linking group formed by combination thereof, and any of these may contain a spirodioxane ring.]

According to a composition for forming a colored layer according to a third aspect of the present invention, in the first or second aspect, the ionizing radiation-curable resin (B) further contains a polymer containing a structural unit represented by following formula (2),

[Chemical Formula 2]

(2)

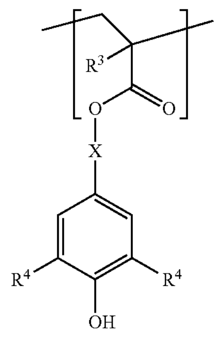

[where $R^3$ represents a hydrogen atom, halogen atom, carboxyl group, sulfo group, cyano group, hydroxy group, alkyl group having 10 or fewer carbon atoms, alkoxycarbonyl group having 10 or fewer carbon atoms, alkylsulfonylaminocarbonyl group having 10 or fewer carbon atoms, arylsulfonylaminocarbonyl group, alkylsulfonyl group, arylsulfonyl group, acylaminosulfonyl group having 10 or fewer carbon atoms, alkoxy group having 10 or fewer carbon atoms, alkylthio group having 10 or fewer carbon atoms, aryloxy group having 10 or fewer carbon atoms, nitro group, alkoxycarbonyloxy group, aryloxycarbonyloxy group, acyloxy group having 10 or fewer carbon atoms, acyl group having 10 or fewer carbon atoms, carbamoyl group, sulfamoyl group, aryl group having 10 or fewer carbon atoms, substituted amino group, substituted ureido group, substituted phosphono group, or a heterocyclic group; $R^4$ represents a hydrogen atom or an alkyl group having 30 or fewer carbon atoms; and X represents a single bond, an ester group, an aliphatic alkyl chain having 30 or fewer carbon atoms, an aromatic chain, a polyethylene glycol chain, or a linking group formed by combination thereof, and any of these may contain a spirodioxane ring.]

According to a composition for forming a colored layer according to a fourth aspect of the present invention, in any one of the first to third aspects, the composition for forming the colored layer may further include one or more additives (E) selected from a radical scavenger, a peroxide decomposer, and a singlet oxygen quencher.

According to a composition for forming a colored layer according to a fifth aspect of the present invention, in the fourth aspect, the singlet oxygen quencher may be a dialkyl phosphate, dialkyldithiocarbamate, or benzenedithiol, or a transition metal complex thereof.

According to a composition for forming a colored layer according to a sixth aspect of the present invention, in any one of the first to fifth aspects, the dye (A) may contain one or more selected from the group consisting of compounds having a porphyrin structure, merocyanine structure, phthalocyanine structure, azo structure, cyanine structure, squarylium structure, coumarin structure, polyene structure, quinone structure, tetradiporphyrin structure, pyrromethene structure, and indigo structure; and a metal complex thereof.

According to a composition for forming a colored layer according to a seventh aspect of the present invention, in any one of the first to sixth aspects, the dye (A) may further contain a third colorant whose wavelength of lowest transmittance within a wavelength range of 380 nm to 780 nm is within a range of 650 nm to 780 nm.

An optical film according to an eighth aspect of the present invention includes a colored layer that is a cured product of the composition for forming the colored layer according to any one of the first to seventh aspects; a transparent substrate located on one surface of the colored layer; and a functional layer located on one or the other surface of the colored layer, wherein one or both of the transparent substrate and the functional layer have an ultraviolet shielding rate of 85% or higher as measured according to a method described in JIS L 1925, and the functional layer functions as an antireflection layer or an antiglare layer.

According to an optical film according to a ninth aspect of the present invention, the optical film of the eighth aspect may further include an oxygen barrier layer having an oxygen permeability of 10 $cm^3/(m^2 \cdot day \cdot atm)$ or lower as the functional layer.

According to an optical film according to a tenth aspect of the present invention, the optical film of the eighth or ninth aspect may further include an antistatic layer or an antifouling layer as the functional layer.

A display device according to an eleventh aspect of the present invention includes the optical film according to any one of the eighth to tenth aspects.

According to a composition for forming a colored layer according to a twelfth aspect of the present invention, the first aspect of the present invention contains a dye (A), an ionizing radiation-curable resin (B), a photoinitiator (C), and a solvent (D).

The dye (A) contains at least one of a first colorant having a wavelength of maximum absorption in a first range of 470 nm to 530 nm, and an absorption spectrum with a full width at half maximum of 15 nm to 45 nm, a second colorant having a wavelength of maximum absorption in a second range of 560 to 620 nm, and an absorption spectrum with a full width at half maximum of 15 nm to 55 nm, and a third colorant whose wavelength of minimum transmittance within a wavelength range of 380 nm to 780 nm is within a third range of 650 nm or higher and 780 nm or lower.

The minimum transmittance of this colorant composition is 1% or higher and lower than 50% in only one of the first to third ranges, and the ionizing radiation-curable resin (B) contains a resin having an amine structure.

The ionizing radiation-curable resin (B) contains a resin having an amine structure.

According to a composition for forming a colored layer according to a thirteenth aspect of the present invention, in the twelfth aspect, the ionizing radiation-curable resin (B) may be a polymer containing a structural unit represented by following formula (1),

[Chemical Formula 3]

(1)

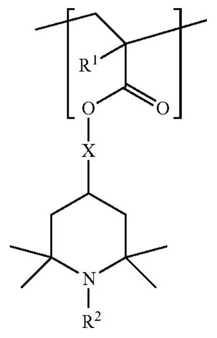

[where $R^1$ represents a hydrogen atom, halogen atom, carboxyl group, sulfo group, cyano group, hydroxy group, alkyl group having 10 or fewer carbon atoms, alkoxycarbonyl group having 10 or fewer carbon atoms, alkylsulfonylaminocarbonyl group having 10 or fewer carbon atoms, arylsulfonylaminocarbonyl group, alkylsulfonyl group, arylsulfonyl group, acylaminosulfonyl group having 10 or fewer carbon atoms, alkoxy group having 10 or fewer carbon atoms, alkylthio group having 10 or fewer carbon atoms, aryloxy group having 10 or fewer carbon atoms, nitro group, alkoxycarbonyloxy group, aryloxycarbonyloxy group, acyloxy group having 10 or fewer carbon atoms, acyl group having 10 or fewer carbon atoms, carbamoyl group, sulfamoyl group, aryl group having 10 or fewer carbon atoms, substituted amino group, substituted ureido group, substituted phosphono group, or a heterocyclic group; $R^2$ represents a hydrogen atom or an alkyl group having 30 or fewer carbon atoms; and X represents a single bond, an ester group, an aliphatic alkyl chain having 30 or fewer carbon atoms, an aromatic chain, a polyethylene glycol chain, or a linking group formed by combination thereof, and any of these may contain a spirodioxane ring.]

According to a composition for forming a colored layer according to a fourteenth aspect of the present invention, in the twelfth aspect, the ionizing radiation-curable resin (B) may further contain a polymer having a structural unit represented by following formula (2),

[Chemical Formula 4]

(2)

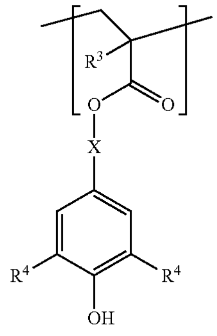

[where $R^3$ represents a hydrogen atom, halogen atom, carboxyl group, sulfo group, cyano group, hydroxy group, alkyl group having 10 or fewer carbon atoms, alkoxycarbonyl group having 10 or fewer carbon atoms, alkylsulfonylaminocarbonyl group having 10 or fewer carbon atoms, arylsulfonylaminocarbonyl group, alkylsulfonyl group, arylsulfonyl group, acylaminosulfonyl group having 10 or fewer carbon atoms, alkoxy group having 10 or fewer carbon atoms, alkylthio group having 10 or fewer carbon atoms, aryloxy group having 10 or fewer carbon atoms, nitro group, alkoxycarbonyloxy group, aryloxycarbonyloxy group, acyloxy group having 10 or fewer carbon atoms, acyl group having 10 or fewer carbon atoms, carbamoyl group, sulfamoyl group, aryl group having 10 or fewer carbon atoms, substituted amino group, substituted ureido group, substituted phosphono group, or a heterocyclic group; $R^4$ represents a hydrogen atom or an alkyl group having 30 or fewer carbon atoms; and X represents a single bond, an ester group, an aliphatic alkyl chain having 30 or fewer carbon atoms, an aromatic chain, a polyethylene glycol chain, or a linking group formed by combination thereof, and any of these may contain a spirodioxane ring.]

A composition for forming a colored layer according to a fifteenth aspect of the present invention may further include, in any one of the twelfth to fourteenth aspects, an additive (E) including one or more selected from a radical scavenger, a peroxide decomposer, and a singlet oxygen quencher.

According to a composition for forming a colored layer according to a sixteenth aspect of the present invention, in the fifteenth aspect, the singlet oxygen quencher may be a dialkyl phosphate, dialkyldithiocarbamate, or benzenedithiol, or a transition metal complex thereof.

According to a composition for forming a colored layer according to a seventeenth aspect of the present invention, in any one of the twelfth to sixteenth aspects, the dye (A) may contain one or more selected from the group consisting of compounds having a porphyrin structure, merocyanine structure, phthalocyanine structure, azo structure, cyanine structure, squarylium structure, coumarin structure, polyene structure, quinone structure, tetradiporphyrin structure, pyrromethene structure, and indigo structure; and a metal complex thereof.

An optical film according to an eighteenth aspect of the present invention includes a colored layer that is a cured product of the composition for forming the colored layer according to any one of the twelfth to seventeenth aspects; a transparent substrate located on one surface of the colored layer; and a functional layer located on one or the other surface of the colored layer.

One or both of the transparent substrate and the functional layer have an ultraviolet shielding rate of 85% or higher as measured according to a method described in JIS L 1925.

The functional layer functions as an antireflection layer or an antiglare layer.

An optical film according to a nineteenth aspect of the present invention may further include, in the eighteenth aspect, an oxygen barrier layer having an oxygen permeability of 10 $cm^3/(m^2 \cdot day \cdot atm)$ or lower as the functional layer.

An optical film according to a twentieth aspect of the present invention may further include, in the eighteenth or nineteenth aspect, an antistatic layer or an antifouling layer as the functional layer.

A display device according to a twenty-first aspect of the present invention includes the optical film according to any one of the eighteenth to twentieth aspects.

Advantageous Effects of the Invention

According to the first to eleventh aspects of the present invention, a composition for forming a colored layer, an optical film, and a display device capable of improving lightfastness and heat resistance, achieving both reflection suppression and luminance efficiency, improving display quality, extending the life of the light-emitting elements, and improving color reproducibility can be provided.

According to the twelfth to twenty-first aspects of the present invention, a composition for forming a colored layer, an optical film, and a display device having a good color correction function and capable of withstanding long-term use can be provided.

DETAILED DESCRIPTION

Embodiments of the present invention will be described below with reference to the drawings. In the following description of the drawings to be referred, components identical with or similar to each other are given the same or similar reference signs. It should be noted that the drawings are only schematically illustrated, and thus the relationship between thickness and two-dimensional size of the components, and any thickness ratios, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. In addition, the drawings are exaggerated as appropriate to facilitate understanding.

Hereinafter, embodiments of the present invention will be described with reference to the drawings.

[Optical Film]

Figure 1:
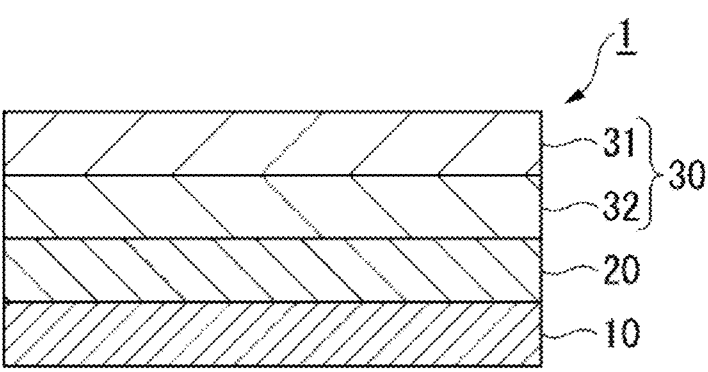
FIG. 1 is a cross-sectional view of an optical film according to a first embodiment of the invention.

Referring to FIG. 1, an optical film according to a first embodiment of the present invention will be described in detail.

As shown in FIG. 1, the optical film 1 includes a colored layer 10, a transparent substrate 20, and a functional layer 30. The functional layer 30 includes a low refractive index layer 31 and a hard coat layer 32. That is, the optical film 1 has the transparent substrate 20 located on one surface of the colored layer 10, and is a laminate in which the colored layer 10, the transparent substrate 20, the hard coat layer 32, and the low refractive index layer 31 are laminated in this order.

The thickness of the optical film 1 may be, for example, preferably in a range of 10 μm to 140 μm, more preferably 15 μm to 120 μm, and still more preferably 20 μm to 100 μm. When the thickness of the optical film 1 is equal to or greater than the lower limit, the strength of the optical film 1 can be further increased. When the thickness of the optical film 1 is equal to or less than the upper limit, not only the optical film 1 can be more lightweight but also the display device can be thinner.

The following description addresses the individual layers forming the optical film 1.

<<Colored Layer>>

The colored layer 10 is obtained by curing the composition for forming a colored layer of the present invention. The composition for forming a colored layer of the present invention contains a dye (A), an ionizing radiation-curable resin (B), a photoinitiator (C), and a solvent (D). The composition for forming a colored layer of the present invention may further contain an additive (E).

The thickness of the colored layer 10 may be, for example, preferably 0.5 μm to 10 μm. When the thickness of the colored layer 10 is equal to or greater than the lower limit, the colored layer 10 can contain a dye to a degree not causing any abnormality in appearance, and the light absorption by the dye improves reflection characteristics and color reproducibility. When the thickness of the colored layer 10 is equal to or less than the upper limit, it is advantageous in making the display device thinner.

The thickness of the colored layer 10 is determined by observing the cross section of the optical film 1 in the thickness direction using a microscope or the like.

<Dye (A)>

The dye (A) in the composition for forming a colored layer according to the above first to eleventh aspects of the present invention contains at least a first colorant and a second colorant.

The wavelength of maximum absorption of the first colorant is within the range of 470 nm to 530 nm, and the full width at half maximum of the absorption spectrum is 15 nm to 45 nm. When the wavelength of maximum absorption is lower than the lower limit, the luminance efficiency for blue light emission is likely to decrease, and when it exceeds the upper limit, the luminance efficiency for green light emission is likely to decrease. When the full width at half maximum of the absorption spectrum is lower than the lower limit, the effect of suppressing external light reflection is reduced. On the other hand, when it exceeds the upper limit, the external light reflection characteristics tend to improve but the luminance efficiency is likely to decrease.

The wavelength of maximum absorption of the second colorant is within the range of 560 nm to 620 nm, and the full width at half maximum of the absorption spectrum is 15 nm to 55 nm. When the wavelength of maximum absorption is lower than the lower limit, the luminance efficiency for green light emission is likely to decrease, and when it exceeds the upper limit, the luminance efficiency for red light emission is likely to decrease. When the full width at half maximum of the absorption spectrum is lower than the lower limit, the effect of suppressing external light reflection is reduced. On the other hand, when it exceeds the upper limit, the external light reflection characteristics tend to improve but the luminance efficiency is likely to decrease.

The dye (A) may further contain another colorant other than the first and second colorants. The other colorant may be a third colorant.

Within the wavelength range of 380 nm to 780 nm, the third colorant exhibits the lowest transmittance in the range of 650 nm to 780 nm. When the wavelength at which the transmittance of the third colorant is lowest within the wavelength range of 380 nm to 780 nm is lower than the lower limit, the luminance efficiency for red light emission is likely to decrease, and when it exceeds the upper limit, the effect of suppressing external light reflection decreases.

The dye (A) in the composition for forming a colored layer according to the first to eleventh aspects of the present invention includes at least one of the following three types of colorants for selectively absorbing light in the wavelength range of visible light. It may include more than one type of colorant.

The first colorant has a wavelength of maximum absorption within a first range of 470 nm to 530 nm, and the full width at half maximum of the absorption spectrum is 15 nm to 45 nm. When the wavelength of maximum absorption is lower than the lower limit, the luminance efficiency for blue light emission is likely to decrease, and when it exceeds the upper limit, the luminance efficiency for green light emission is likely to decrease. When the full width at half maximum of the absorption spectrum is lower than the lower limit, the effect of suppressing external light reflection is reduced. On the other hand, when it exceeds the upper limit, the external light reflection characteristics tend to improve but the luminance efficiency is likely to decrease.

The second colorant has a wavelength of maximum absorption within a second range of 560 nm to 620 nm, and the full width at half maximum of the absorption spectrum is 15 nm to 55 nm. When the wavelength of maximum absorption is lower than the lower limit, the luminance efficiency for green light emission is likely to decrease, and when it exceeds the upper limit, the luminance efficiency for red light emission is likely to decrease. When the full width at half maximum of the absorption spectrum is lower than the lower limit, the effect of suppressing external light reflection is reduced. On the other hand, when it exceeds the upper limit, the external light reflection characteristics tend to improve but the luminance efficiency is likely to decrease.

Within the wavelength range of 380 nm to 780 nm, the third colorant exhibits the lowest transmittance in a third range of 650 nm to 780 nm.

The colored layer 10 has a wavelength of maximum absorption at which the transmittance is 1% or higher and lower than 50% in only one of the first to third ranges.

By using colorants having the above-described absorption characteristics as the first to third colorants contained in the colored layer 10, it is possible to form a colored layer 10 that absorbs a portion of the visible light emitted by the display device that is in a wavelength range in which the light emission intensity is relatively low.

The dye (A) preferably contains a compound having a porphyrin structure, merocyanine structure, phthalocyanine structure, azo structure, cyanine structure, squarylium structure, coumarin structure, polyene structure, quinone structure, tetradiporphyrin structure, pyrromethene structure, or indigo structure; or a metal complex thereof. In particular, it is more preferable to use a metal complex having a porphyrin structure, pyrromethene structure, or phthalocyanine structure, or a compound having a squarylium structure because of their high reliability. The dye (A) may contain only one of these compounds or metal complexes thereof, or two or more of them. These compounds or metal complexes thereof may be contained in the first, second, or third colorant, or in two or more of these colorants.

<Ionizing Radiation-Curable Resin (B)>

The ionizing radiation-curable resin (B) is a resin that is cured by irradiating the resin with ionizing radiation such as ultraviolet light or electron beams for polymerization. For example, monofunctional, bifunctional, or trifunctional (meth)acrylate monomers or urethane (meth)acrylates, or those with more functional groups can be used, but the ionizing radiation-curable resin (B) of the present invention includes a resin that at least has the ability to scavenge radicals (radical scavenging ability). Here, "(meth)acrylate" means both or one of "acrylate" and "methacrylate".

An example of a resin having radical scavenging ability included in the ionizing radiation-curable resin (B) is a resin having an amine structure. The "amine structure" refers to a structure in which the hydrogen atom of ammonia is replaced with a hydrocarbon group or an aromatic group. Examples of the amine structure include primary amine, secondary amine, and tertiary amine. It may also be a quaternary ammonium cation.

The radical scavenging resin suppresses dye deterioration (fading) by scavenging radicals and suppressing autooxidation when the dye (A) undergoes oxidative deterioration. An example of a resin having a radical scavenging amine structure is a resin having a hindered amine structure and a molecular weight of 2,000 or more. When the molecular weight of the resin having a hindered amine structure is 2,000 or more, the effect of suppressing fading can be improved. This is considered to be because many molecules remain in the colored layer 10, and thus a sufficient effect of suppressing fading can be obtained.

The upper limit of the molecular weight of the resin having a hindered amine structure is not particularly limited, and may be, for example, 50,000.

The term "molecular weight" as used herein means "mass average molecular weight" measured by gel permeation chromatography (GPC) using polystyrene as the standard substance.

The resin having a radical scavenging amine structure is preferably a polymer with a structural unit represented by the following formula (1).

[Chemical Formula 5]

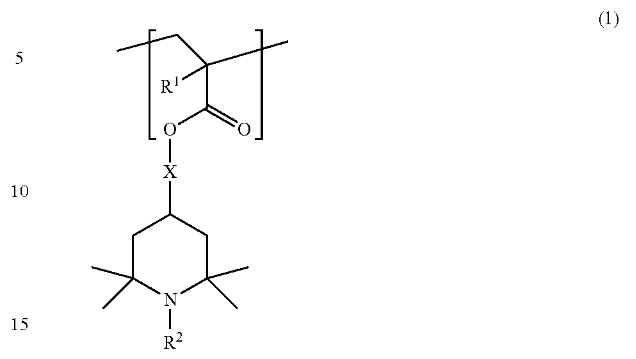

(1)

In formula (1), $R^1$ represents a hydrogen atom, halogen atom, carboxyl group, sulfo group, cyano group, hydroxy group, alkyl group having 10 or fewer carbon atoms, alkoxycarbonyl group having 10 or fewer carbon atoms, alkylsulfonylaminocarbonyl group having 10 or fewer carbon atoms, arylsulfonylaminocarbonyl group, alkylsulfonyl group, arylsulfonyl group, acylaminosulfonyl group having 10 or fewer carbon atoms, alkoxy group having 10 or fewer carbon atoms, alkylthio group having 10 or fewer carbon atoms, aryloxy group having 10 or fewer carbon atoms, nitro group, alkoxycarbonyloxy group, aryloxycarbonyloxy group, acyloxy group having 10 or fewer carbon atoms, acyl group having 10 or fewer carbon atoms, carbamoyl group, sulfamoyl group, aryl group having 10 or fewer carbon atoms, substituted amino group, substituted ureido group, substituted phosphono group, or a heterocyclic group; $R^2$ represents a hydrogen atom or an alkyl group having 30 or fewer carbon atoms; and X represents a single bond, an ester group, an aliphatic alkyl chain having 30 or fewer carbon atoms, an aromatic chain, a polyethylene glycol chain, or a linking group formed by combining them. Any of them may contain a spirodioxane ring.

$R^1$ is preferably a hydrogen atom, a hydroxy group, or an alkyl group having 10 or fewer carbon atoms. The number of carbon atoms in the alkyl group is preferably 1 to 6, more preferably 1 to 3.

$R^2$ is preferably a hydrogen atom or an alkyl group having 10 or fewer carbon atoms. The number of carbon atoms in the alkyl group is preferably 1 to 6, more preferably 1 to 3.

X is preferably a single bond or an aliphatic alkyl chain having 30 or fewer carbon atoms. The number of carbon atoms in the aliphatic alkyl chain is preferably 10 or fewer, preferably 1 to 6, more preferably 2 to 4.

In addition, the main component (the component with the highest mass %) of the resin having a radical scavenging amine structure is a copolymer of the structural unit represented by formula (1) and a copolymer component having one of the following repeating units. It becomes possible to control the compatibility with other components by being a copolymer.

Examples of the repeating units include (meth)acrylate repeating units, olefin repeating units, halogen atom-containing repeating units, styrene repeating units, vinyl acetate repeating units, and vinyl alcohol repeating units.

Examples of (meth)acrylate repeating units include repeating units derived from (meth)acrylate monomers having a linear or branched alkyl group in their side chains, and repeating units derived from (meth)acrylate monomers having a hydroxyl group in their side chains.

Examples of the repeating units derived from (meth) acrylate monomers having a linear or branched alkyl group in their side chains include components derived from monomers such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, hexyl (meth)acrylate, heptyl (meth)acrylate, octyl (meth)acrylate, isooctyl (meth)acrylate, 2-ethylhexyl acrylate, nonyl (meth) acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth) acrylate, myristyl (meth)acrylate, pentadecyl (meth)acrylate, hexadecyl (meth)acrylate, heptadecyl (meth)acrylate, and octadecyl (meth)acrylate. These may be used alone or in combination of two or more. Among the above examples, (meth)acrylate repeating units having a linear or branched alkyl group with 1 to 4 carbon atoms in their side chains are preferable.

Examples of the repeating units derived from (meth) acrylic monomers having a hydroxyl group in their side chains include components derived from monomers such as 2-hydroxyethyl (meth)acrylate, 2-hydroxypropyl (meth) acrylate, 4-hydroxybutyl (meth)acrylate, 6-hydroxyhexyl (meth)acrylate, and hydroxyphenyl (meth)acrylate. These may be used alone or in combination of two or more.

Examples of olefinic repeating units include components derived from olefinic monomers such as ethylene, propylene, isoprene, and butadiene. These may be used alone or in combination of two or more.

Examples of halogen atom-containing repeating units include components derived from monomers such as vinyl chloride and vinylidene chloride. These may be used alone or in combination of two or more.

Examples of styrene repeating units include components derived from styrene monomers such as styrene, α-methylstyrene, and vinyltoluene. These may be used alone or in combination of two or more.

Examples of vinyl acetate repeating units include esters of saturated carboxylic acids and vinyl alcohol such as vinyl acetate and vinyl propionate. These may be used alone or in combination of two or more.

An example of a vinyl alcohol repeating unit is vinyl alcohol, and it may have a 1,2-glycol bond in its side chain.

The copolymer may have the structure of a random copolymer, alternating copolymer, block copolymer or graft copolymer. The manufacturing process and preparation with other components are easy when the copolymer has the structure of a random copolymer. Therefore, a random copolymer is preferred to the other copolymers.

Radical polymerization may be used as the polymerization method for obtaining the copolymer. Radical polymerization is preferable because it facilitates industrial production. The radical polymerization may be solution polymerization, emulsion polymerization, bulk polymerization, or suspension polymerization. The radical polymerization is preferably solution polymerization. By using solution polymerization, the molecular weight of the copolymer can be easily controlled.

In radical polymerization, before adding a polymerization initiator to polymerize the monomers, the monomers may be diluted with a polymerization solvent.

The polymerization solvent may be, for example, an ester solvent, alcohol ether solvent, ketone solvent, aromatic solvent, amide solvent, or alcohol solvent. The ester solvent may be, for example, methyl acetate, ethyl acetate, n-butyl acetate, isobutyl acetate, t-butyl acetate, methyl lactate, or ethyl lactate. The alcohol ether solvent may be, for example, ethylene glycol monomethyl ether, ethylene glycol monoethyl ether, propylene glycol monomethyl ether, propylene glycol monomethyl ether acetate, propylene glycol monoethyl ether, 3-methoxy-1-butanol, or 3-methoxy-3-methyl-1-butanol. The ketone solvent may be, for example, acetone, methyl ethyl ketone, methyl isobutyl ketone, or cyclohexanone. The aromatic solvent may be, for example, benzene, toluene, or xylene. The amide solvent may be, for example, formamide or dimethylformamide. The alcohol solvent may be, for example, methanol, ethanol, n-propanol, isopropanol, n-butanol, isobutanol, s-butanol, t-butanol, diacetone alcohol, or 2-methyl-2-butanol. One of the polymerization solvents described above may be used alone or two or more may be mixed together.

The radical polymerization initiator may be, for example, a peroxide or an azo compound. The peroxide may be, for example, benzoyl peroxide, t-butyl peroxyacetate, t-butyl peroxybenzoate, or di-t-butyl peroxide. The azo compound may be, for example, azobisisobutyronitrile, an azobisamidinopropane salt, an azobiscyanovaleric acid (salt), or 2,2'-azobis[2-methyl-N-(2-hydroxyethyl) propionamide].

When the resin having a radical scavenging amine structure is a polymer with the structural unit represented by formula (1), the content of the structural unit represented by formula (1) is preferably 1 to 100 mol %, more preferably 35 to 100 mol % relative to the total molar quantity of the monomers constituting the ionizing radiation-curable resin (B). When the content of the structural unit represented by formula (1) is within this range, the lightfastness and heat resistance of the dye (A) are improved, which in turn assists suppressing fading.

The ionizing radiation-curable resin (B) may further contain a polymer having a structural unit represented by the following formula (2).

[Chemical Formula 6]

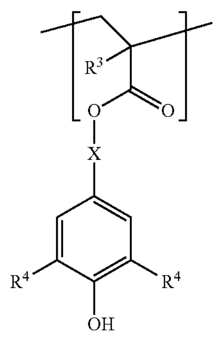

(2)

In formula (2), $R^3$ represents a hydrogen atom, halogen atom, carboxyl group, sulfo group, cyano group, hydroxy group, alkyl group having 10 or fewer carbon atoms, alkoxycarbonyl group having 10 or fewer carbon atoms, alkylsulfonylaminocarbonyl group having 10 or fewer carbon atoms, arylsulfonylaminocarbonyl group, alkylsulfonyl group, arylsulfonyl group, acylaminosulfonyl group having 10 or fewer carbon atoms, alkoxy group having 10 or fewer carbon atoms, alkylthio group having 10 or fewer carbon atoms, aryloxy group having 10 or fewer carbon atoms, nitro group, alkoxycarbonyloxy group, aryloxycarbonyloxy group, acyloxy group having 10 or fewer carbon atoms, acyl group having 10 or fewer carbon atoms, carbamoyl group, sulfamoyl group, aryl group having 10 or fewer carbon atoms, substituted amino group, substituted ureido group, substituted phosphono group, or a heterocyclic group; $R^4$ represents a hydrogen atom or an alkyl group having 30 or fewer carbon atoms; and X represents a single bond, an ester group, an aliphatic alkyl chain having 30 or fewer carbon atoms, an aromatic chain, a polyethylene glycol chain, or a linking group formed by combining them. Any of them may contain a spirodioxane ring.

$R^3$ is preferably a hydrogen atom, a hydroxy group, or an alkyl group having 10 or fewer carbon atoms. The number of carbon atoms in the alkyl group is preferably 1 to 6, more preferably 1 to 3.

$R^4$ is preferably a hydrogen atom or an alkyl group having 10 or fewer carbon atoms. The number of carbon atoms in the alkyl group is preferably 1 to 6, more preferably 1 to 3.

X is preferably a single bond or an aliphatic alkyl chain having 30 or fewer carbon atoms. The number of carbon atoms in the aliphatic alkyl chain is preferably 10 or fewer, preferably 1 to 6, more preferably 2 to 4.

In this embodiment, the polymer having the structural unit represented by formula (2) may be a copolymer with a monomer that is different from the structural unit represented by formula (2). It becomes possible to control the compatibility with other components by being a copolymer.

The copolymer component may be, for example, a component including one of the above-described (meth)acrylate repeating units, olefin repeating units, halogen atom-containing repeating units, styrene repeating units, vinyl acetate repeating units, and vinyl alcohol repeating units.

The copolymer may have the structure of a random copolymer, alternating copolymer, block copolymer or graft copolymer. The manufacturing process and preparation with other components are easy when the copolymer has the structure of a random copolymer. Therefore, a random copolymer is preferred to the other copolymers.

Radical polymerization may be used as the polymerization method for obtaining the copolymer. Radical polymerization is preferable because it facilitates industrial production. The radical polymerization may be solution polymerization, emulsion polymerization, bulk polymerization, or suspension polymerization. The radical polymerization is preferably solution polymerization. By using solution polymerization, the molecular weight of the copolymer can be easily controlled.

In radical polymerization, before adding a polymerization initiator to polymerize the monomers, the monomers may be diluted with a polymerization solvent.

The polymerization solvent may be, for example, an ester solvent, alcohol ether solvent, ketone solvent, aromatic solvent, amide solvent, or alcohol solvent. The ester solvent may be, for example, methyl acetate, ethyl acetate, n-butyl acetate, isobutyl acetate, t-butyl acetate, methyl lactate, or ethyl lactate. The alcohol ether solvent may be, for example, ethylene glycol monomethyl ether, ethylene glycol monoethyl ether, propylene glycol monomethyl ether, propylene glycol monomethyl ether acetate, propylene glycol monoethyl ether, 3-methoxy-1-butanol, or 3-methoxy-3-methyl-1-butanol. The ketone solvent may be, for example, acetone, methyl ethyl ketone, methyl isobutyl ketone, or cyclohexanone. The aromatic solvent may be, for example, benzene, toluene, or xylene. The amide solvent may be, for example, formamide or dimethylformamide. The alcohol solvent may be, for example, methanol, ethanol, n-propanol, isopropanol, n-butanol, isobutanol, s-butanol, t-butanol, diacetone alcohol, or 2-methyl-2-butanol. One of the polymerization solvents described above may be used alone or two or more may be mixed together.

The radical polymerization initiator may be, for example, a peroxide or an azo compound. The peroxide may be, for example, benzoyl peroxide, t-butyl peroxyacetate, t-butyl peroxybenzoate, or di-t-butyl peroxide. The azo compound may be, for example, azobisisobutyronitrile, an azobisamidinopropane salt, an azobiscyanovaleric acid (salt), or 2,2'-azobis[2-methyl-N-(2-hydroxyethyl) propionamide].

When the total amount of monomers is taken as 100 parts by mass, the amount of the radical polymerization initiator is preferably 0.0001 parts by mass or more and 20 parts by mass or less, more preferably 0.001 parts by mass or more and 15 parts by mass or less, and further preferably 0.005 parts by mass or more and 10 parts by mass or less. The radical polymerization initiator may be added to the monomers and the polymerization solvent before initiating polymerization, or may be dropped into the polymerization reaction system. Dropping the radical polymerization initiator into the polymerization reaction system for the monomers and the polymerization solvent is preferable in that the heat generation caused by polymerization can be suppressed.

The reaction temperature for radical polymerization is selected as appropriate according to the types of radical polymerization initiator and polymerization solvent. The reaction temperature is preferably 60° C. or higher and 110° C. or lower in order to facilitate manufacturing and reaction control.

When the ionizing radiation-curable resin (B) contains a polymer having the structural unit represented by formula (2), the content of the structural unit represented by formula (2) is preferably 1 to 50 mol %, more preferably 1 to 30 mol % relative to the total molar quantity of the monomers constituting the ionizing radiation-curable resin (B). When the content of the structural unit represented by formula (2) is within this range, the lightfastness and heat resistance of the dye (A) are improved, which in turn assists suppressing fading.

Examples of the monofunctional (meth)acrylate compound the ionizing radiation-curable resin (B) may contain include 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloylmorpholine, N-vinylpyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth) acrylate, 3-methoxybutyl (meth)acrylate, ethyl carbitol (meth)acrylate, phosphate (meth)acrylate, ethylene-oxide-modified phosphate (meth)acrylate, phenoxy (meth)acrylate, ethylene-oxide-modified phenoxy (meth)acrylate, propylene-oxide-modified phenoxy (meth)acrylate, nonyl phenol (meth)acrylate, ethylene-oxide-modified nonyl phenol (meth)acrylate, propylene-oxide-modified nonyl phenol (meth)acrylate, methoxy diethylene glycol (meth)acrylate, methoxy polyethylene glycol (meth)acrylate, methoxy propylene glycol (meth)acrylate, 2-(meth)acryloyl oxyethyl-2-hydroxy propyl phthalate, 2-hydroxy-3-phenoxy propyl (meth)acrylate, 2-(meth)acryloyl oxyethyl hydrogen phthalate, 2-(meth)acryloyl oxypropyl hydrogen phthalate, 2-(meth)acryloyl oxypropyl hexahydro hydrogen phthalate, 2-(meth)acrylol oxypropyl tetrahydro hydrogen phthalate, dimethylaminoethyl (meth)acrylate, trifluoroethyl (meth) acrylate, tetrafluoropropyl (meth)acrylate, hexafluoropropyl (meth)acrylate, octafluoropropyl (meth)acrylate, and adamantine derivative mono(meth)acrylate, such as adamanthyl acrylate having monovalent mono(meth)acrylate which is derived from 2-adamantane and adamantine diol. Here, "(meth)acryloyl" means both or one of "acryloyl" and "methacryloyl".

Examples of the bifunctional (meth)acrylate compound the ionizing radiation-curable resin (B) may contain include di(meth)acrylates, such as ethylene glycol di(meth)acrylate, diethylene glycol di(meth)acrylate, butanediol di(meth) acrylate, hexanediol di(meth)acrylate, nonanediol di(meth) acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, and hydroxy pivalate neopentyl glycol di(meth)acrylate.

Examples of the trifunctional (meth)acrylate compound or (meth)acrylate compound having more functional groups that the ionizing radiation-curable resin (B) may contain include tri(meth)acrylates such as trimethylolpropane tri (meth)acrylate, ethoxylated trimethylolpropane tri(meth) acrylate, propoxylated trimethylolpropane tri(meth)acrylate, tris2-hydroxyethylisocyanurate tri(meth)acrylate or glycerin tri(meth)acrylate, trifunctional (meth)acrylate compounds such as pentaerythritol tri(meth)acrylate, dipentaerythritol tri(meth)acrylate or ditrimethylolpropane tri(meth)acrylate, polyfunctional (meth)acrylate compounds having three or more functional groups such as pentaerythritol tetra(meth) acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate or ditrimethylolpropane hexa(meth)acrylate, and polyfunctional (meth)acrylate compounds obtained by substituting part of these (meth) acrylate substituted with an alkyl group or ε-caprolactone.

Urethane (meth)acrylate can also be used as the resin that the ionizing radiation-curable resin (B) may contain. Examples of urethane (meth)acrylate include those obtained by reacting a (meth)acrylate monomer having a hydroxyl group with a product of the reaction between a polyester polyol with an isocyanate monomer or a prepolymer.

Examples of urethane (meth)acrylate include a pentaerythritol triacrylate hexamethylene diisocyanate urethane prepolymer, dipentaerythritol pentaacrylate hexamethylene diisocyanate urethane prepolymer, pentaerythritol triacrylate toluene diisocyanate urethane prepolymer, dipentaerythritol pentaacrylate toluene diisocyanate urethane prepolymer, pentaerythritol triacrylate isophorone diisocyanate urethane prepolymer, and dipentaerythritol pentaacrylate isophorone diisocyanate urethane prepolymer.

The above-listed other monofunctional, bifunctional, or trifunctional (meth)acrylate monomers or urethane (meth) acrylates, those with more functional groups, or the like that the ionizing radiation-curable resin (B) can contain may be used alone or in combination of two or more. It may also be a partially polymerized oligomer.

The content of the ionizing radiation-curable resin (B) is preferably 20 to 80% by mass, more preferably 30 to 70% by mass relative to the total mass of the composition for forming the colored layer. When the content of the ionizing radiation-curable resin (B) is equal to or more than the lower limit, the effect of suppressing fading can be further enhanced. When the content of the ionizing radiation-curable resin (B) is equal to or lower than the upper limit, the composition for forming the colored layer can be handled even easier.

<Photoinitiator (C)>

For example, when ultraviolet light is used as the ionizing radiation, the photoinitiator (C) generates radicals when ultraviolet light is irradiated.

Examples of photoinitiators (C) include benzoins (including benzoin and benzoin alkyl ethers such as benzoin methyl ether, benzoin ethyl ether, and benzoin isopropyl ether), phenyl ketones [for example, acetophenones (including acetophenone, 2-hydroxy-2-methyl-1-phenylpropane-1-one, 2,2-dimethoxy-2-phenylacetophenone, 2,2-diethoxy-2-phenylacetophenone, and 1,1-dichloroacetophenone), alkylphenyl ketones such as 2-hydroxy-2-methylpropiophenone; and cycloalkylphenyl ketones such as 1-hydroxycyclohexylphenyl ketone], aminoacetophenones {including 2-methyl-1-[4-(methylthio)phenyl]-2-morpholinoaminopropanone-1,2-benzyl-2-dimethylamino-1-(4-morpholinophenyl)-butanone-1}, anthraquinones (including anthraquinone, 2-methylanthraquinone, 2-ethylanthraquinone, 2-t-butylanthraquinone, and 1-chloroanthraquinone), thioxanthones (including 2,4-dimethylthioxanthone, 2,4-diethylthioxanthone, 2-chlorothioxanthone, and 2,4-diisopropylthioxanthone), ketals (including acetophenone dimethyl ketal and benzyl dimethyl ketal), benzophenones (including benzophenone), xanthones, and phosphine oxides (for example, 2,4,6-trimethylbenzoyldiphenylphosphine oxide). These photoinitiators may be used singly or in combination of two or more.

The content of the photoinitiator (C) is preferably 0.01 to 20 mass %, more preferably 0.01 to 5 mass % relative to the solid content of the composition for forming the colored layer. When the content of the photoinitiator (C) is less than the lower limit, the curing effect will be insufficient. When the content of the photoinitiator (C) exceeds the upper limit, part of the photoinitiator (C) remains unreacted and degrades the reliability of properties such as heat resistance.

<Solvent (D)>

Examples of the solvent (D) include ethers, ketones, esters, and cellosolves. Examples of ethers include dibutyl ether, dimethoxymethane, dimethoxyethane, diethoxyethane, propylene oxide, 1,4-dioxane, 1,3-dioxolane, 1,3,5-trioxane, tetrahydrofuran, anisole, and phenetole. Examples of ketones include acetone, methyl ethyl ketone, diethyl ketone, dipropyl ketone, diisobutyl ketone, methyl isobutyl ketone, cyclopentanone, cyclohexanone, methylcyclohexanone, and ethylcyclohexanone. Examples of esters include ethyl formate, propyl formate, n-pentyl formate, methyl acetate, ethyl acetate, methyl propionate, ethyl propionate, n-pentyl acetate, and γ-butyrolactone. Examples of cellosolves include methyl cellosolve, cellosolve (ethyl cellosolve), butyl cellosolve, and cellosolve acetate. One or a combination of two or more of the solvents (D) may be used.

The content of the solvent (D) is preferably 20 to 80 mass %, more preferably 30 to 70 mass % relative to the total mass of the composition for forming the colored layer. When the content of the solvent (D) is equal to or more than the lower limit, the composition for forming the colored layer can be handled even easier. When the content of the solvent (D) is equal to or lower than the upper limit, the time required to form the colored layer can be reduced.

<Additive (E)>

The additive (E) may be one or more selected from a radical scavenger, a peroxide decomposer, and a singlet oxygen quencher.

Examples of radical scavengers include hindered amine photostabilizers such as 4-isopropylaminodiphenylamine, N-phenyl-1-naphthylamine, and 1,2,2,6,6-pentamethyl-4-piperidyl methacrylate; and phenolic antioxidants such as 2,6-di-t-butyl-p-cresol and 6,6'-di-t-butyl-4,4'-butylidenedi-m-cresol.

Examples of peroxide decomposers include sulfur-based antioxidants such as ditridecyl-3,3'-thiodipropionate, 2-mercaptobenzothiazole, and 2-mercaptobenzimidazole; and phosphite-based antioxidants such as tris(nonylphenyl) phosphite and 2-ethylhexyl diphenyl phosphite.

Examples of singlet oxygen quenchers include dialkyl phosphates, dialkyldithiocarbamates, benzenedithiols, and transition metal complexes of similar dithiols.

One or a combination of two or more of the additives (E) may be used.

Other additives such as a leveling agent, antifoaming agent, antioxidant, ultraviolet absorber, photostabilizer, photosensitizer, and conductive material may be used as the additive (E).

The content of the additive (E) is preferably 0.1 to 20 mass %, more preferably 0.1 to 15 mass % relative to the solid content of the composition for forming the colored layer. When the content of the additive (E) is less than the lower limit, the effect of suppressing fading is not obtained with regard to the lightfastness and heat resistance of the dye (A). When the content of the additive (E) exceeds the upper limit, it tends to lead to insufficient curing due to curing inhibition by the additive (E) and/or a decreased amount of the curing component.

By containing the composition for forming a colored layer of the present invention, the colored layer 10 improves lightfastness and heat resistance, and in the first to eleventh aspects described above, it is possible to achieve both reflection suppression and luminance efficiency, improve display quality, extend the life of the light emitting elements, and improve color reproducibility.

In the twelfth to twenty-first aspects, the color correction function can be maintained for a long time.

<<Transparent Substrate>>

The transparent substrate 20 is a sheet-like member located on one surface of the colored layer 10 and forming an optical film 1.

A resin film having translucency may be used as the transparent substrate 20.

The forming material of the transparent substrate 20 may be a transparent resin or inorganic glass. Examples of transparent resin include polyolefin, polyester, polyacrylate, polyamide, polyimide, polyarylate, polycarbonate, triacetyl cellulose, polyvinyl alcohol, polyvinyl chloride, cycloolefin copolymer, norbornene-containing resin, polyether sulfone, and polysulfone. Examples of polyolefins include polyethylene and polypropylene. Examples of polyesters include polyethylene terephthalate, polybutylene terephthalate, and polyethylene naphthalate. An example of polyacrylate is polymethyl methacrylate. Examples of polyamides include nylon 6 and nylon 66. Among these, suitable examples are a film of polyethylene terephthalate (PET), a film of triacetyl cellulose (TAC), a film of polymethyl methacrylate (PMMA), and a film of polyester other than PET.

Although the thickness of the transparent substrate 20 is not specifically limited, it is preferably in a range of 10 μm to 100 μm, for example.

The transmittance of the transparent substrate 20 is preferably, for example, 90% or higher.

The transparent substrate 20 may be provided with the ability to absorb ultraviolet light. The transparent substrate 20 can be given the ability to absorb ultraviolet light by adding an ultraviolet absorber to the resin material of the transparent substrate 20.

Examples of ultraviolet absorbers include salicylic acid ester ultraviolet absorbers, benzophenone ultraviolet absorbers, benzotriazole ultraviolet absorbers, benzotriazine ultraviolet absorbers, and cyanoacrylate ultraviolet absorbers.

These ultraviolet absorbers may be used singly or in combination of two or more.

When the transparent substrate 20 is provided with the ability to absorb ultraviolet light, it preferably has an ultraviolet shielding rate of 85% or higher. The ultraviolet shielding rate is a value measured in accordance with JIS L 1925, and is calculated by the following formula (I).

Ultraviolet shielding rate (%)=100−Average transmittance of ultraviolet light with a wavelength of 290 nm to 400 nm (%) (I)

An ultraviolet shielding rate below 85% reduces the effect of suppressing fading with regard to the lightfastness of the dye (A).

Figure 11:
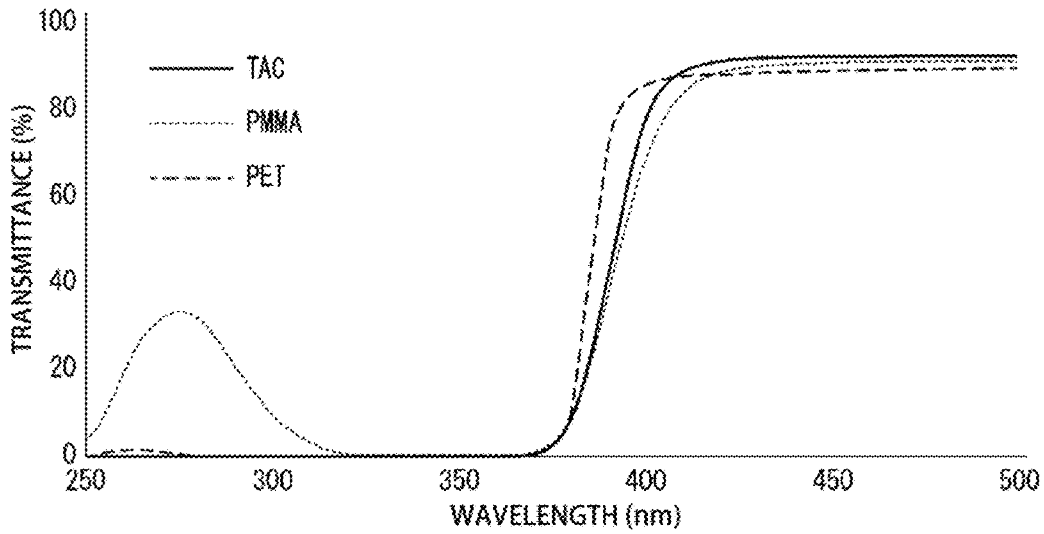
FIG. 11 is a graph showing a light transmission profile of a transparent substrate.

FIG. 11 shows the light transmission profiles of polymethyl methacrylate (PMMA), triacetyl cellulose (TAC), and polyethylene terephthalate (PET) that have been given the ability to absorb ultraviolet light. The ultraviolet shielding rates of the transparent substrates shown by the light transmission profiles in FIG. 11 are as follows. Any of them can be suitably used as the transparent substrate 20 of the present invention.

<<Functional Layer>>

The functional layer 30 is located on one or the other surface of the colored layer 10. By having the functional layer 30, the optical film can exhibit various functions.

Examples of the functions of the functional layer 30 include antireflection function, antiglare function, oxygen barrier function, antistatic function, antifouling function, reinforcement function, and ultraviolet absorption function (ability to absorb ultraviolet light).

The functional layer 30 may be a monolayer or a multilayer. The functional layer 30 may have one function or two or more functions.

When the optical film 1 has an antireflection function, the functional layer 30 functions as an antireflection layer. Examples of the antireflection layer include a low refractive index layer 31 having a lower refractive index than a hard coat layer 32, an antiglare layer 34, and the transparent substrate 20, which will be described later. The low refractive index layer 31 can be formed by using, for the functional layer, a material having a lower refractive index than the materials of the hard coat layer 32, the antiglare layer 34, and the transparent substrate 20.

To adjust the refractive index of the low refractive index layer 31, fine particles of lithium fluoride (LiF), magnesium fluoride ($MgF_2$), sodium hexafluoroaluminum (cryolite, $3NaF \cdot AlF_3$, $Na_3AlF_6$), or aluminum fluoride ($AlF_3$), or fine silica particles may be added. It is effective to use particles having internal voids, such as fine, porous silica particles or hollow silica particles, as the fine silica particles to reduce the refractive index of the low refractive index layer 31. The photoinitiator (C), solvent (D), or additive (E) described in relation to the colored layer 10 may be added to the composition for forming the low refractive index layer 31 (composition for forming a low refractive index layer) as appropriate.

The refractive index of the low refractive index layer 31 is preferably 1.20 to 1.55.

Although the thickness of the low refractive index layer 31 is not specifically limited, it is preferably in a range of 40 nm to 1 μm, for example.

When the optical film 1 has an antiglare function, the functional layer 30 functions as an antiglare layer 34.

The antiglare layer 34 has small irregularities on its surface so that they scatter external light to suppress reflection and in turn improve display quality. When combined with the low refractive index layer 31, the low refractive index layer 31 and the antiglare layer 34 constitute an antireflection layer.

The antiglare layer 34 contains at least one selected from fine organic particles and fine inorganic particles as necessary. The fine organic particles are materials that form small irregularities on the surface and provide the function of scattering external light. Examples of fine organic particles include resin particles of translucent resin materials such as acrylic resin, polystyrene resin, styrene-(meth)acrylate copolymers, polyethylene resin, epoxy resin, silicone resin, polyvinylidene fluoride, and polyethylene fluoride resin. In order to adjust the refractive index and the dispersibility of resin particles, two or more types of resin particles having different characteristics (refractive indexes) may be mixed.

The fine inorganic particles are a material for controlling sedimentation and aggregation of the fine organic particles. Examples of fine inorganic particles include fine silica particles, fine metal oxide particles, and fine particles of various minerals. Examples of fine silica particles include colloidal silica, and fine silica particles surface-modified with a reactive functional group such as an (meth)acryloyl group. Examples of fine metal oxide particles include fine particles of alumina (aluminum oxide), zinc oxide, tin oxide, antimony oxide, indium oxide, titania (titanium dioxide), and zirconia (zirconium dioxide). Examples of fine mineral particles include fine particles of mica, synthetic mica, vermiculite, montmorillonite, iron-montmorillonite, bentonite, beidellite, saponite, hectorite, stevensite, nontronite, magadiite, ilerite, kanemite, layered titanate, smectite, and synthetic smectite. The fine mineral particles may either be natural or synthetic (including substituted products and derivatives), and also a mixture of both may be used. Among these fine mineral particles, organic layered clay is more preferable.

Organic layered clay refers to a swelling clay in which organic onium ions are introduced between layers. The organic onium ion is not particularly limited as long as it can make a swelling clay organic by using the cation exchange properties of the swelling clay. When an organic layered clay mineral is used as the fine mineral particles, the synthetic smectite can be suitably used. Synthetic smectite has a function of increasing the viscosity of the coating liquid for forming the antiglare layer. This suppresses the sedimentation of resin particles and fine inorganic particles and adjusts the shape of the irregularities on the surface of the antiglare layer 34 (functional layer 30).

When the optical film 1 has an oxygen barrier function, the functional layer 30 functions as an oxygen barrier layer 33. The oxygen barrier layer 33 has an oxygen permeability of 10 $cm^3/(m^2 \cdot day \cdot atm)$ or lower, preferably 5 $cm^3/(m^2 \cdot day \cdot atm)$ or lower, and more preferably 1 $cm^3/(m^2 \cdot day \cdot atm)$ or lower. When the oxygen permeability of the oxygen barrier layer 33 is equal to or lower than the upper limit, the functional layer 30 can be provided with a sufficient oxygen barrier function. The lower limit of the oxygen permeability of the oxygen barrier layer 33 is not particularly limited, and may be 0 $cm^3/(m^2 \cdot day \cdot atm)$.

The oxygen permeability of the oxygen barrier layer 33 is a value measured using an oxygen permeability measuring device at 30° C. and a relative humidity of 60%.

When the optical film 1 has an antistatic function, the functional layer 30 functions as an antistatic layer. Examples of the antistatic layer include layers containing antistatic agents such as fine metal oxide particles such as antimony-doped tin oxide (ATO) and tin-doped indium oxide (ITO), polymeric conductive compositions, and quaternary ammonium salts.

The antistatic layer may be provided on the outermost surface of the functional layer 30 or between the functional layer 30 and the transparent substrate 20. Alternatively, the antistatic layer may be formed by adding an antistatic agent to one of the above-described layers constituting the functional layer 30. When an antistatic layer is provided, the optical film preferably has a surface resistance of $1.0 \times 10^6$ to $1.0 \times 10^{12}$ (Ω/cm).

When the optical film 1 has an antifouling function, the functional layer 30 functions as an antifouling layer. The antifouling layer improves the antifouling performance by imparting both or one of water repellency and oil repellency. Examples of the antifouling layer include layers containing antifouling agents such as silicon oxide, fluorine-containing silane compounds, fluoroalkylsilazane, fluoroalkylsilane, fluorine-containing silicon compounds, and perfluoropolyether group-containing silane coupling agents.

The antifouling layer may be provided on the outermost surface of the functional layer 30, or formed by adding an antifouling agent to the outermost layer of the functional layer(s) 30.

When the optical film 1 has a reinforcement function, the functional layer 30 functions as a reinforcement layer. The reinforcement layer is a layer that reinforces the optical film. An example of the reinforcement layer is the hard coat layer 32. Examples of the hard coat layer 32 include layers formed with a hard coat agent containing monofunctional, bifunctional, or trifunctional (meth)acrylate or urethane (meth) acrylate, or (meth)acrylate or urethane (meth)acrylate with more functional groups.

When the optical film 1 has the ability to absorb ultraviolet light, the functional layer 30 functions as an ultraviolet absorbing layer. Examples of the ultraviolet absorbing layer include layers containing triazine ultraviolet absorbers such as 2-(4,6-diphenyl-1,3,5-triazin-2-yl)-5-hexyloxyphenol and benzotriazole ultraviolet absorbers such as 2-(2H-benzotriazole-2-yl)-4-methylphenol.

The content of the ultraviolet absorber is preferably 0.1 to 5 mass % relative to the total mass of the materials forming the ultraviolet absorbing layer. When the content of the ultraviolet absorber is equal to or more than the lower limit, the functional layer 30 can be provided with sufficient ultraviolet absorbance. When the content of the ultraviolet absorber is equal to or lower than the upper limit, it is possible to avoid insufficient hardness due to a decrease in the amount of the curing component.

In the optical film 1, one or both of the transparent substrate 20 and the functional layer 30 have an ultraviolet shielding rate of 85% or higher, preferably 90% or higher, more preferably 95% or higher. It may even be 100%. When the ultraviolet shielding rate is equal to or higher than the lower limit, lightfastness and heat resistance can be further improved.

The ultraviolet shielding rate can be measured according to the method described in JIS L 1925.

The ultraviolet shielding rate can be adjusted by imparting ultraviolet absorbing ability to one or both of the transparent substrate 20 and the functional layer 30.

The thickness of the functional layer 30 may be, for example, preferably in a range of 0.04 μm to 25 μm, more preferably 0.1 μm to 20 μm, and still more preferably 0.2 μm to 15 μm. When the thickness of the functional layer 30 is equal to or greater than the lower limit, it becomes easier to impart various functions to the optical film 1. When the thickness of the functional layer 30 is equal to or less than the upper limit, it is advantageous in making the display device thinner.

[Method of Manufacturing Optical Film]

The optical film 1 of this embodiment can be manufactured by a conventionally known method.

For example, the colored layer 10 is obtained by applying a composition for forming the colored layer to one surface of the transparent substrate 20 and curing the composition by irradiating it with ionizing radiation.

The light source for irradiating the composition for forming the colored layer with ionizing radiation to cure it and form the colored layer 10 can be any light source that generates ionizing radiation. Examples of the ionizing radiation include optical energy radiation such as radiation (such as gamma rays and X-rays), ultraviolet light, visible light, and electron beams (EB). Usually ultraviolet light and electron beams are used. Examples of lamps emitting ultraviolet light include low-pressure mercury vapor lamps, medium-pressure mercury vapor lamps, high-pressure mercury vapor lamps, carbon arc lamps, metal halide lamps, xenon lamps, and electrodeless lamps. The ultraviolet light is usually irradiated at 100 to 1000 $mJ/cm^2$.

Next, a hard coat agent is applied to the other surface of the transparent substrate 20. As with the colored layer 10, the applied hard coat agent is irradiated with ionizing radiation to cure it, thereby obtaining the hard coat layer 32.

By forming the low refractive index layer 31 on the hard coat layer 32, an optical film 1 having the functional layer 30 on the other surface of the transparent substrate 20 can be obtained.

The method of forming the low refractive index layer 31 is not particularly limited. For example, it may be formed by applying a composition for forming a low refractive index layer to the hard coat layer 32 and irradiating the applied composition with ionizing radiation to cure it, vacuum evaporation, sputtering, ion plating, an ion beam method, or plasma-enhanced chemical vapor deposition.

Other Embodiments

Figure 2:
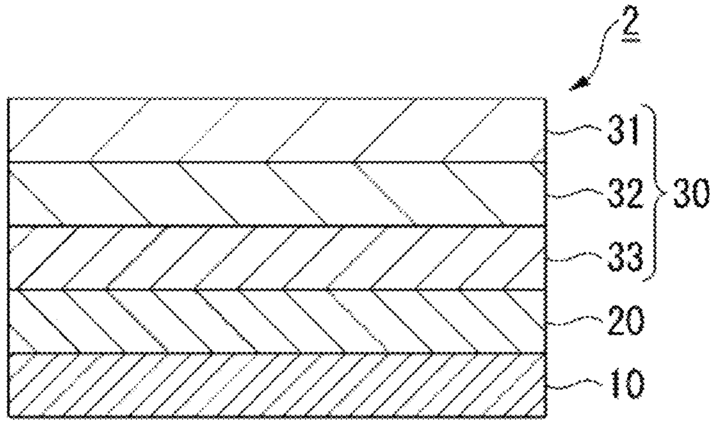
FIG. 2 is a cross-sectional view of an optical film according to another embodiment of the invention.

As shown in FIG. 2, the optical film may be an optical film 2 in which the transparent substrate 20 is located on one surface of the colored layer 10, and the colored layer 10, the transparent substrate 20, the oxygen barrier layer 33, the hard coat layer 32, and the low refractive index layer 31 are laminated in this order. In the optical film 2, the oxygen barrier layer 33, the hard coat layer 32, and the low refractive index layer 31 constitute the functional layer 30.

Since the optical film 2 of this embodiment has the oxygen barrier layer 33, it exhibits better oxygen barrier performance than the optical film 1.

Figure 3:
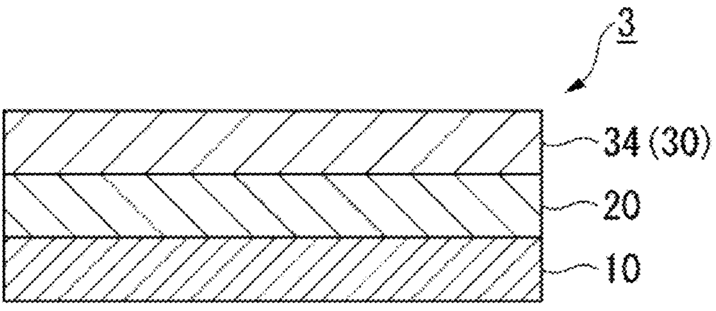
FIG. 3 is a cross-sectional view of an optical film according to another embodiment of the invention.

As shown in FIG. 3, the optical film may be an optical film 3 in which the transparent substrate 20 is located on one surface of the colored layer 10, and the colored layer 10, the transparent substrate 20, and the antiglare layer 34 are laminated in this order. In the optical film 3, the antiglare layer 34 forms the functional layer 30.

Since the optical film 3 of this embodiment has the antiglare layer 34, it suppresses reflection well.

Figure 4:
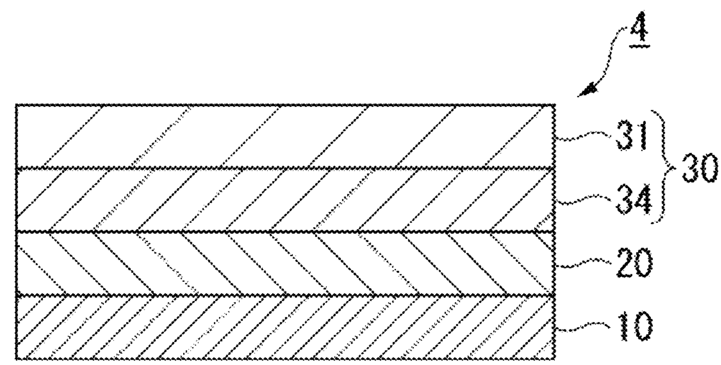
FIG. 4 is a cross-sectional view of an optical film according to another embodiment of the invention.

As shown in FIG. 4, the optical film may be an optical film 4 in which the transparent substrate 20 is located on one surface of the colored layer 10, and the colored layer 10, the transparent substrate 20, the antiglare layer 34, and the low refractive index layer 31 are laminated in this order. In the optical film 4, the antiglare layer 34 and the low refractive index layer 31 constitute the functional layer 30.

Since the optical film 4 of this embodiment has the low refractive index layer 31 and the antiglare layer 34, it suppresses reflection even better.

Figure 5:
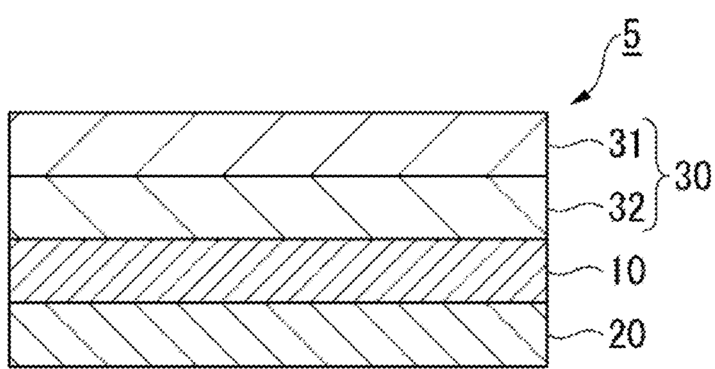
FIG. 5 is a cross-sectional view of an optical film according to another embodiment of the invention.

As shown in FIG. 5, the optical film may be an optical film 5 in which the transparent substrate 20 is located on one surface of the colored layer 10, and the functional layer 30 is located on the other surface of the colored layer 10. In the optical film 5, the transparent substrate 20, the colored layer 10, the hard coat layer 32, and the low refractive index layer 31 are laminated in this order. In the optical film 5, the hard coat layer 32 and the low refractive index layer 31 constitute the functional layer 30.

The optical film 5 of this embodiment has the colored layer 10 and the functional layer 30 having an ultraviolet absorbing function and an antireflection function on one surface of the transparent substrate 20.

Figure 6:
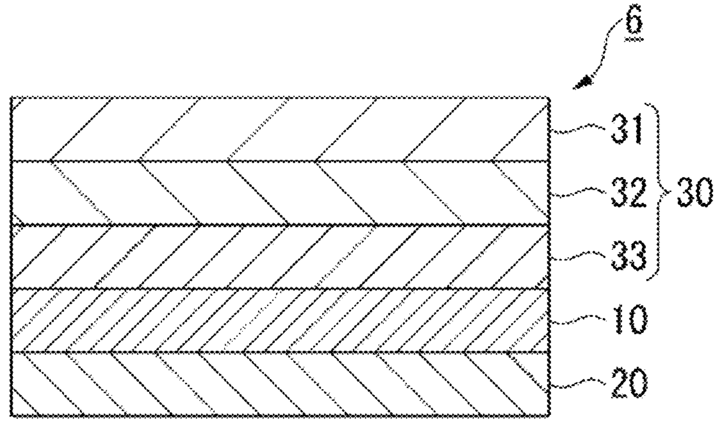
FIG. 6 is a cross-sectional view of an optical film according to another embodiment of the invention.

As shown in FIG. 6, the optical film may be an optical film 6 in which the transparent substrate 20 is located on one surface of the colored layer 10, and the functional layer 30 is located on the other surface of the colored layer 10. In the optical film 6, the transparent substrate 20, the colored layer 10, the oxygen barrier layer 33, the hard coat layer 32, and the low refractive index layer 31 are laminated in this order. In the optical film 6, the oxygen barrier layer 33, the hard coat layer 32, and the low refractive index layer 31 constitute the functional layer 30.

Since the optical film 6 of this embodiment has the oxygen barrier layer 33, it exhibits good oxygen barrier performance.

Figure 7:
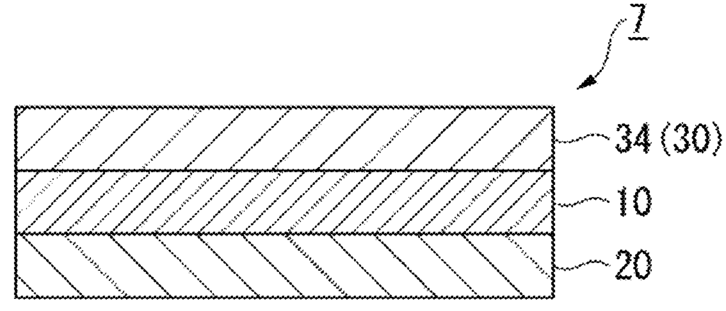
FIG. 7 is a cross-sectional view of an optical film according to another embodiment of the invention.

As shown in FIG. 7, the optical film may be an optical film 7 in which the transparent substrate 20 is located on one surface of the colored layer 10, and the functional layer 30 is located on the other surface of the colored layer 10. In the optical film 7, the transparent substrate 20, the colored layer 10, and the antiglare layer 34 are laminated in this order. In the optical film 7, the antiglare layer 34 forms the functional layer 30.

Since the optical film 7 of this embodiment has the antiglare layer 34, it suppresses reflection well.

Figure 8:
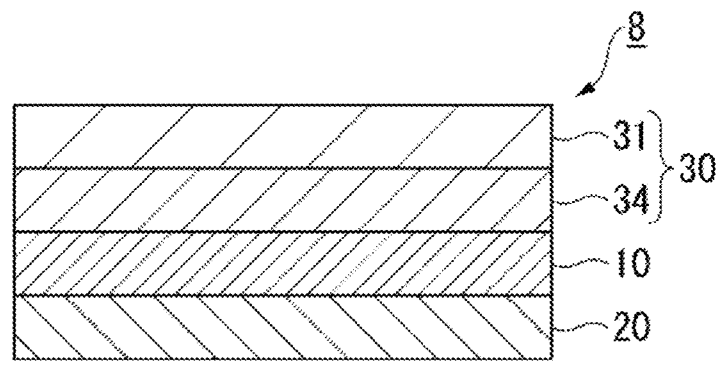
FIG. 8 is a cross-sectional view of an optical film according to another embodiment of the invention.

As shown in FIG. 8, the optical film may be an optical film 8 in which the transparent substrate 20 is located on one surface of the colored layer 10, and the functional layer 30 is located on the other surface of the colored layer 10. In the optical film 8, the transparent substrate 20, the colored layer 10, the antiglare layer 34, and the low refractive index layer 31 are laminated in this order. In the optical film 8, the antiglare layer 34 and the low refractive index layer 31 constitute the functional layer 30.

Since the optical film 8 of this embodiment has the low refractive index layer 31 and the antiglare layer 34, it suppresses reflection even better.

[Display Device]

The display device of the present invention has the optical film of the present invention. Specific examples of the display device include television, monitors, mobile phones, portable game machines, portable information terminals, personal computers, electronic books, video cameras, digital still cameras, head mounted displays, navigation systems, sound reproduction devices (car audio systems, digital audio players, and the like), copiers, facsimiles, printers, multi-function printers, vending machines, automated teller machines (ATM), personal identification devices, optical communication devices, and IC cards. It is particularly suitably applied to display devices having self-emissive elements such as LEDs, organic EL, inorganic phosphor, and quantum dots that are susceptible to external light reflection due to having metal electrodes and wiring.

According to the optical film of this embodiment, since it has a colored layer containing the composition for forming a colored layer of the present invention, lightfastness and heat resistance can be improved, and therefore reflection suppression and luminance efficiency can both be achieved. This allows a display device including the optical film of this embodiment to improve display quality and extend the life of the light-emitting elements.

When the optical film of this embodiment is applied to a display device, the reflectiveness of the display device decreases significantly. In addition, whereas it is said that the transmittance is halved when a circularly polarizing plate is used, a high white display transmittance, good luminance efficiency, and improved color reproducibility are provided. This makes it possible to achieve both improved display characteristics and reliability.

Furthermore, a display device to which the optical film of this embodiment is applied has a good balance between white display performance and color reproducibility. Since it is also highly reliable, it can withstand long-term use.

An embodiment of the present invention has been described in detail with reference to the accompanying drawings. The present invention should not be construed as limited to this embodiment, and it encompasses modifications, combinations, and the like thereof that do not depart from the spirit of the invention.

For example, although the optical film of this embodiment has one colored layer 10, there may be two or more colored layers.

In the optical film of this embodiment, the ultraviolet absorbing ability may be imparted to the transparent substrate 20 or to the functional layer 30 such as the hard coat layer 32.

EXAMPLES

The present invention will be described in more detail below with reference to Examples of the first to eleventh aspects described above; however, the present invention should not be limited to these examples.

Examples 1 to 8 and Comparative Examples 1 to 5

In the following examples and comparative examples, optical films A to M having the layer structures shown in Tables 1 and 2 were prepared. Simulations were performed using the prepared optical films A to M to evaluate their optical film characteristics and display device characteristics when applied to an organic EL panel. In the tables, "-" means that the layer was not provided.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Optical film | Optical film A | Optical film B | Optical film C | Optical film D | Optical film E | Optical film F | Optical film G | Optical film H |
| Functional layer 1 | Low refractive index layer | Low refractive index layer | Low refractive index layer | — | Low refractive index layer | Low refractive index layer | Low refractive index layer | Low refractive index layer |
| Functional layer 2 | Hard coat layer 1 | Hard coat layer 1 | Hard coat layer 1 | Antiglare layer | Antiglare layer | Hard coat layer 2 | Hard coat layer 1 | Hard coat layer 1 |
| Functional layer 3 | — | — | — | — | — | — | Oxygen barrier layer | — |
| Colored layer | — | — | — | — | — | Colored layer 3 | — | — |
| Transparent substrate | TAC | TAC | TAC | TAC | TAC | PMMA | TAC | TAC |
| Colored layer | Colored layer 1 | Colored layer 2 | Colored layer 3 | Colored layer 3 | Colored layer 3 | — | Colored layer 3 | Colored layer 4 |

TABLE 2

| | Comp. Ex. 1 | Comp. Ex. 2 | Comp. Ex. 3 | Comp. Ex. 4 | Comp. Ex. 5 |
|---|---|---|---|---|---|
| Optical film | Optical film I | Optical film J | Optical film K | Optical film L | Optical film M |
| Functional layer 1 | Low refractive index layer | Low refractive index layer | Low refractive index layer | Low refractive index layer | Low refractive index layer |
| Functional layer 2 | Hard coat layer 1 | Hard coat layer 1 | Hard coat layer 1 | Hard coat layer 1 | Hard coat layer 1 |
| Functional layer 3 | — | — | — | — | — |
| Colored layer | — | — | — | Colored layer 8 | — |
| Transparent substrate | TAC | TAC | TAC | TAC | TAC |
| Colored layer | Colored layer 5 | Colored layer 6 | Colored layer 7 | — | — |

<<Preparation of Optical Film>>

How the layers were formed will be described.

[Formation of Colored Layer]

(Materials of Composition for Forming Colored Layer)

The following materials were used for the composition for forming the colored layer.

Note that the wavelength of maximum absorption, the full width at half maximum, and the wavelength of minimum transmittance in a specified wavelength range of a colorant are its characteristic values in the state of a cured coating film.

<Dye (A)>

First Colorant

Dye-1:Pyrromethene cobalt complex dye represented by the following formula (3) (with a wavelength of maximum absorption of 493 nm, a full width at half maximum of 26 nm).

Second Colorant

Dye-2: Tetraazaporphyrin copper complex dye (PD-311S manufactured by Yamamoto Chemicals Inc., with a wavelength of maximum absorption of 586 nm and a full width at half maximum of 22 nm).

Dye-3: Tetraazaporphyrin copper complex dye (FDG-007 manufactured by Yamada Chemical Co., Ltd., with a wavelength of maximum absorption of 595 nm and a full width at half maximum of 22 nm).

Third Colorant

Dye-4: Phthalocyanine copper complex dye (FDN-002 manufactured by Yamada Chemical Co., Ltd., with a wavelength of minimum transmittance of 780 nm within 380 to 780 nm).

[Chemical Formula 7]

(3)

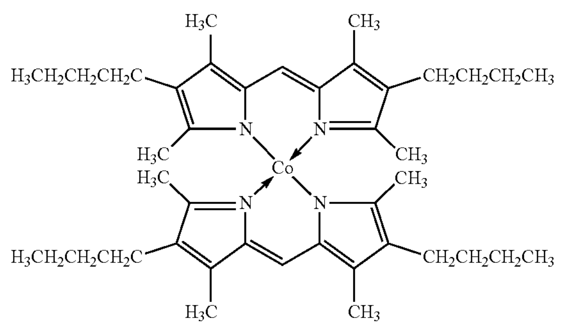

<Ionizing Radiation-Curable Resin (B)>

- Resin 1: A resin (molecular weight 120,000) having an amine structure where, in formula (1), $R^1$ is $CH_3$, $R^2$ is $CH_3$, and X is a single bond.
- Resin 2: A resin (molecular weight 51,500) having a phenol structure where, in formula (2), $R^3$ is $CH_3$, $R^4$ is H, and X is a single bond.
- UA-306H: Pentaerythritol triacrylate hexamethylene diisocyanate urethane prepolymer (UA-306H manufactured by Kyoeisha Chemical Co., Ltd.).
- DPHA: Dipentaerythritol hexaacrylate.
- PETA: Pentaerythritol triacrylate.

Manufacturing Example of Resin 1

2.4 g of 1,2,2,6,6-pentamethyl-4-piperidyl methacrylate (FA-711MM manufactured by Showa Denko Materials Co., Ltd.), 5.6 g of methyl methacrylate (manufactured by Kanto Chemical Co., Inc.), 31 g of cyclohexanone (manufactured by Kanto Chemical Co., Inc.), and 0.11 g of 2,2'-azobis (isobutyronitrile) (manufactured by FUJIFILM Wako Pure Chemical Corporation) were put in a reaction vessel and heated and stirred for 8 hours at 70° C. in a nitrogen gas atmosphere. After that, the mixture was heated and stirred for 1 hour at 100° C. to obtain a polymer solution. This polymer solution was poured into 400 mL of methanol (manufactured by Kanto Chemical Co., Inc.) and then filtered to collect the precipitate. By drying the precipitate, the resin 1 that is a copolymer of 1,2,2,6,6-pentamethyl-4-piperidyl methacrylate:methyl methacrylate=15:85 [mol %] was obtained.

Manufacturing Example of Resin 2

2.4 g of 4-Hydroxyphenyl methacrylate (Shonol ARP-029P manufactured by Showa Denko K.K.), 5.6 g of methyl methacrylate (manufactured by Kanto Chemical Co., Inc.), 32 g of cyclohexanone (manufactured by Kanto Chemical Co., Inc.), and 0.11 g of 2,2'-azobis(isobutyronitrile) (manufactured by FUJIFILM Wako Pure Chemical Corporation) were put in a reaction vessel and heated and stirred for 8 hours at 70° C. in a nitrogen gas atmosphere. After that, the mixture was heated and stirred for 1 hour at 100° C. to obtain a polymer solution.

This polymer solution was poured into 400 mL of methanol (manufactured by Kanto Chemical Co., Inc.) and then filtered to collect the precipitate. By drying the precipitate, the resin 2 that is a copolymer of 4-hydroxyphenyl methacrylate:methyl methacrylate=19:81 [mol %] was obtained.

By additionally heating and stirring for an hour at 100° C., the initiator 2,2'-azobis(isobutyronitrile) can be completely decomposed. This suppresses deterioration of the optical film due to the remaining initiator.

By pouring the polymer solution into methanol, unreacted monomers, polymerization solvent, the products of the decomposition of the initiator, and the like can be removed, which suppresses deterioration of the optical film.

<Photoinitiator (C)>

- Omnirad TPO: An acyl phosphine oxide photoinitiator (manufactured by IGM Resins B.V.).

<Solvent (D)>

- MEK: Methyl ethyl ketone.
- Methyl acetate: Methyl acetate.

<Additive (E)>

- D1781: A singlet oxygen quencher, bis(dibutyldithiocarbamic acid) nickel (II), product code D1781 (manufactured by Tokyo Chemical Industry Co., Ltd.).
- Tinuvin 249: A hindered amine photostabilizer, Tinuvin (registered trademark) 249 (manufactured by BASF Japan Ltd., molecular weight 482).
- AO-60: Phenolic antioxidant, ADK STAB (registered trademark) AO-60 (manufactured by ADEKA CORPORATION).
- Tinuvin 479: A hydroxyphenyltriazine ultraviolet absorber, Tinuvin (registered trademark) 479 (manufactured by BASF Japan Ltd.).
- LA-36: A benzotriazole ultraviolet absorber, ADK STAB (registered trademark) LA-36 (manufactured by ADEKA CORPORATION).

(Transparent Substrate)

The following materials were used for the transparent substrates.

TAC: A triacetyl cellulose film (TG60UL manufactured by FUJIFILM Corporation, substrate thickness 60 μm, ultraviolet shielding rate 92.9%).

PMMA: A polymethyl methacrylate film (manufactured by Sumitomo Chemical Co., Ltd., W002N80, substrate thickness 80 μm, ultraviolet shielding rate 13.9%).

(Formation of Colored Layer)

The compositions for forming colored layers shown in Table 3 were applied onto the transparent substrates shown in Tables 1 and 2, and dried in an oven at 80° C. for 60 seconds. After that, the coating film was cured by irradiating it with ultraviolet light at an irradiation dose of 150 mJ/cm$^2$ using an ultraviolet irradiation device (a light source, H-bulb, manufactured by Fusion UV Systems Japan) so that a colored layer having a film thickness of 5.0 μm after curing is formed.

Note that the amount added is expressed in mass ratio (mass %). In the tables, "-" means that the component is not present.

Additive (Ultraviolet (UV) Absorber)

Tinuvin 479: A hydroxyphenyltriazine ultraviolet absorber, Tinuvin (registered trademark) 479 (manufactured by BASF Japan Ltd.).

LA-36: A benzotriazole ultraviolet absorber, ADK STAB (registered trademark) LA-36 (manufactured by ADEKA CORPORATION).

Solvent

MEK: Methyl ethyl ketone.

Methyl acetate: Methyl acetate.

(Formation of Hard Coat Layer)

The compositions for forming hard coat layers shown in Table 4 were applied onto the transparent substrates or oxygen barrier layers shown in Tables 1 and 2, and dried in an oven at 80° C. for 60 seconds. After that, the coating film was cured by irradiating it with ultraviolet light at an irradiation dose of 150 mJ/cm$^2$ using an ultraviolet irradiation device (a light source, H-bulb, manufactured by Fusion UV Systems Japan) so that a hard coat layer having a film thickness of 5.0 μm after curing is formed. Note that the amount added is expressed in mass ratio (mass %). In the tables, "-" means that the component is not present.

TABLE 3

| | | Colored layer 1 | Colored layer 2 | Colored layer 3 | Colored layer 4 | Colored layer 5 | Colored layer 6 | Colored layer 7 | Colored layer 8 |
|---|---|---|---|---|---|---|---|---|---|
| Dye | First colorant | Dye-1 | | | | | | | |
| (A) | Amount added | 0.2% | 0.2% | 0.2% | 0.2% | 0.2% | 0.2% | 0.2% | 0.2% |
| | Second colorant | Dye-2/Dye-3 | | | | | | | |
| | Ratio | 60/40 | | | | | | | |
| | Amount added | 0.5% | | 0.5% | 0.5% | | 0.4% | 0.5% | |
| | Third colorant | — | — | — | Dye-4 | — | — | — | — |
| | Amount added | — | — | — | 1.3% | — | — | — | — |
| Ionizing radiation-curable resin | Type | Resin 1/UA-306H/DPHA/PETA | | | Resin 1/Resin 2/UA-306H/DPHA/PETA | | UA-306H/DPHA/PETA | | |
| (B) | Ratio | 10/59/17/8 | | | 10/20/45/13/6 | | 70/20/10 | | |
| | Amount added | 47.4% | 47.4% | 46.7% | 45.1% | 47.4% | 45.9% | 46.7% | 45.8% |
| Photoinitiator | Type | Omnirad TPO | | | | | | | |
| (C) | Amount added | 4.6% | | | | | | | |
| Solvent | Type | MEK/Methyl acetate | | | | | | | |
| (D) | Ratio | 50/50 | | | | | | | |
| | Amount added | 50% | | | | | | | |
| Additive (E) | Type | — | — | D1781 | | — | Tinuvin 249 | AO-60 | Tinuvin 479/LA-36 |
| | Ratio | — | — | 100 | | — | 100 | 100 | 40/60 |
| | Amount added | — | — | 1.4% | | — | 2.9% | 1.4% | 3.2% |

[Formation of Functional Layer: Oxygen Barrier Layer]

(Composition for Forming Oxygen Barrier Layer)

Polyvinyl alcohol (PVA) resin for binders, 80 mass % aqueous solution of Kuraray Poval (registered trademark) PVA-117 (manufactured by Kuraray Co., Ltd.).

(Formation of Oxygen Barrier Layer)

The above composition for forming an oxygen barrier layer was applied to the transparent substrate of Example 7 shown in Table 1, and dried to form an oxygen barrier layer having an oxygen permeability of 1 cm$^3$/(m$^2$·day·atm).

[Formation of Functional Layer: Hard Coat Layer]

(Materials of Composition for Forming Hard Coat Layer)

The following materials were used for the composition for forming the hard coat layer.

Ionizing Radiation-Curable Resin

UA-306H: Pentaerythritol triacrylate hexamethylene diisocyanate urethane prepolymer (UA-306H manufactured by Kyoeisha Chemical Co., Ltd.).

DPHA: Dipentaerythritol hexaacrylate.

PETA: Pentaerythritol triacrylate.

Photoinitiator

Omnirad TPO: An acyl phosphine oxide photoinitiator (manufactured by IGM Resins B.V.).

TABLE 4

| | | Hard coat layer 1 | Hard coat layer 2 |
|---|---|---|---|
| Ionizing radiation-curable resin | Type | UA-306H/DPHA/PETA | |
| | Ratio | 70/20/10 | |
| | Amount added | 45.4% | 42.2% |
| Photoinitiator | Type | Omnirad TPO | |
| | Amount added | 4.6% | |
| UV absorber | Type | — | Tinuvin 479/LA-36 |
| | Ratio | — | 40/60 |
| | Amount added | — | 3.2% |
| Solvent | Type | MEK/Methyl acetate | |
| | Ratio | 50/50 | |
| | Amount added | 50% | |

[Formation of Functional Layer: Antiglare Layer]

(Composition for Forming Antiglare Layer)

The following materials were used for the composition for forming the antiglare layer.

Ionizing Radiation-Curable Resin

A pentaerythritol triacrylate, Light Acrylate PE-3A (manufactured by Kyoeisha Chemical Co., Ltd., refractive index 1.52) 43.7 parts by mass.

Photoinitiator

Omnirad TPO (manufactured by IGM Resins B.V.) 4.55 parts by mass.

Resin Particles

Styrene-methyl methacrylate copolymer particles (refractive index 1.515, average particle size 2.0 μm) 0.5 part by mass.

Fine Inorganic Particles

Synthetic smectite 0.25 parts by mass.

Alumina nanoparticles (average particle size 40 nm) 1.0 parts by mass.

Solvent

Toluene 15 parts by mass.

Isopropyl alcohol 35 parts by mass.

(Formation of Antiglare Layer)

The above composition for forming an antiglare layer was applied onto a transparent substrate shown in Table 1, and dried in an oven at 80° C. for 60 seconds. After that, the coating film was cured by irradiating it with ultraviolet light at an irradiation dose of 150 mJ/cm$^2$ using an ultraviolet irradiation device (a light source, H-bulb, manufactured by Fusion UV Systems Japan) so that an antiglare layer having a film thickness of 5.0 μm after curing is formed.

(Formation of Functional Layer: Low Refractive Index Layer)

(Composition for Forming the Low Refractive Index Layer)

The following materials were used for the composition for forming the low refractive index layer.

Refractive Index Modifier

A dispersion of fine, porous silica particles (average particle size 75 nm, solid content 20%) in methyl isobutyl ketone 8.5 parts by mass.

Antifouling Agent

Optool (registered trademark) AR-110 (manufactured by Daikin Industries, Ltd., solid content 15%, solvent: methyl isobutyl ketone) 5.6 parts by mass.

Ionizing Radiation-Curable Resin

Pentaerythritol triacrylate (PETA) 0.4 parts by mass.

Photoinitiator

Omnirad TPO (manufactured by IGM Resins B.V.) 0.07 parts by mass.

Leveling Agent

RS-77 (manufactured by DIC Corporation) 1.7 parts by mass.

Solvent

Methyl ethyl ketone 83.73 parts by mass.

(Formation of Low Refractive Index Layer)

The above composition for forming the low refractive index layer was applied onto the hard coat layers or oxygen barrier layers shown in Tables 1 and 2, and dried in an oven at 80° C. for 60 seconds. After that, the coating film was cured by irradiating it with ultraviolet light at an irradiation dose of 200 mJ/cm$^2$ using an ultraviolet irradiation device (a light source, H-bulb, manufactured by Fusion UV Systems Japan) so that a low refractive index layer having a film thickness of 100 nm after curing is formed.

[Evaluation of Film Characteristics]

<Ultraviolet Shielding Rate on Colored Layer>

When the transparent substrate was used as a layer above the colored layer, the transmittance was measured using an automatic spectrophotometer (U-4100 manufactured by Hitachi, Ltd.). When the colored layer was provided above the substrate, the layers above the colored layer were peeled off using a transparent pressure-sensitive adhesive tape that satisfies the JIS-K5600-5-6:1999 adhesion test. Then, using an adhesive tape as a reference, the transmittance of the layers above the colored layer was measured with the automatic spectrophotometer (U-4100 manufactured by Hitachi, Ltd.). These transmittance values were used to calculate the average transmittance [%] in the ultraviolet region (290 nm to 400 nm), and the UV shielding rate [%] was obtained by subtracting the average transmittance [%] in the ultraviolet region (290 nm to 400 nm) from 100%.

<Lightfastness Test>

In the lightfastness test of the obtained optical films, the films were tested using a xenon weather meter testing machine (X75 manufactured by Suga Test Instruments Co., Ltd.) for 120 hours with a xenon lamp illuminance of 60 W/m$^2$ (300 nm to 400 nm) and at a temperature of 45° C. and humidity (RH) of 50% inside the testing machine. Using the automatic spectrophotometer (U-4100 manufactured by Hitachi, Ltd.), the transmittance was measured before and after the test to calculate a transmittance difference $\Delta T\lambda 1$ between before and after the test at a wavelength $\lambda 1$ at which the minimum transmittance is obtained before the test within the wavelength range of 470 nm to 530 nm, as well as a transmittance difference $\Delta T\lambda 2$ between before and after the test at a wavelength $\lambda 2$ at which the minimum transmittance is obtained before the test within the wavelength range of 560 nm to 620 nm. The closer the transmittance difference is to zero, the better, and preferably $|\Delta T\lambda N| \leq 20$ (N=1 to 3), more preferably $|\Delta T\lambda N| \leq 10$ (N=1 to 3).

<Heat Resistance Test>

In the heat resistance test of the obtained optical films, the films were tested for 500 hours at a temperature of 90° C. Using the automatic spectrophotometer (U-4100 manufactured by Hitachi, Ltd.), the transmittance was measured before and after the test to calculate a transmittance difference $\Delta T\lambda 1$ between before and after the test at a wavelength $\lambda 1$ at which the minimum transmittance is obtained before the test within the wavelength range of 470 nm to 530 nm, as well as a transmittance difference $\Delta T\lambda 2$ between before and after the test at a wavelength $\lambda 2$ at which the minimum transmittance is obtained before the test within the wavelength range of 560 nm to 620 nm. The closer the transmittance difference is to zero, the better, and preferably $|\Delta T\lambda N| \leq 20$ (N=1 to 3), more preferably $|\Delta T\lambda N| \leq 10$ (N=1 to 3).

[Evaluation of Display Device Characteristics]

<White Display Transmission Properties>

The transmittance of the obtained optical films was measured with the automatic spectrophotometer (U-4100 manufactured by Hitachi, Ltd.). Using this transmittance, the efficiency of light transmitted through the optical film during the white display was calculated and used as an evaluation of the white display transmission properties. As a reference, the efficiency of the spectrum during the white display output from a white organic EL light source and through a color filter having the spectrum shown in FIG. 9 was set as 100. The closer it is to 100, the higher the white display transmittance and the better the luminance efficiency.

<Display Device Reflection Properties>

The transmittance T (λ) and surface reflectance R (λ) were measured for each of the obtained optical films using the automatic spectrophotometer (U-4100 manufactured by Hitachi, Ltd.). To measure the surface reflectance R(λ), a matte black dye was applied to the surface of the functional layer opposite to its outermost surface to prevent reflection, and the spectral reflectance was measured at an incident angle of 5° and used as the surface reflectance R(λ). In addition, assuming that the display panel has a reflectance of 40%, without considering any interface reflection or surface reflection from the other layers, and setting the reflectance of the display device without the optical film for a D65 light source (Commission Internationale de l'Eclairage (CIE) standard light source D65) as 100, the relative reflection was calculated based on the following formula (II). The calculated relative reflectance was used as an evaluation of the display device reflection properties. The lower the value of the display device reflection properties, the more the reflection of external light can be reduced and the better the reflection properties.

[Equation 1]

Display device reflection properties = (II)

$$Km \times \int_{380}^{780} \{R(\lambda) + (1 - R(\lambda)) \times P(\lambda) \times T(\lambda) \times \bar{y}(\lambda) \times 40\%\} d\lambda$$

$$Km = 100 / \int_{380}^{780} P(\lambda) \times \bar{y}(\lambda) d\lambda$$

where R(λ) represents the surface reflectance of the outermost layer on the observer side, T(λ) represents the transmittance of the optical film, P(λ) represents the spectrum of the D65 light source, and y(λ) represents a CIE 1931 color matching function.

<Color Reproducibility>

Figure 9:
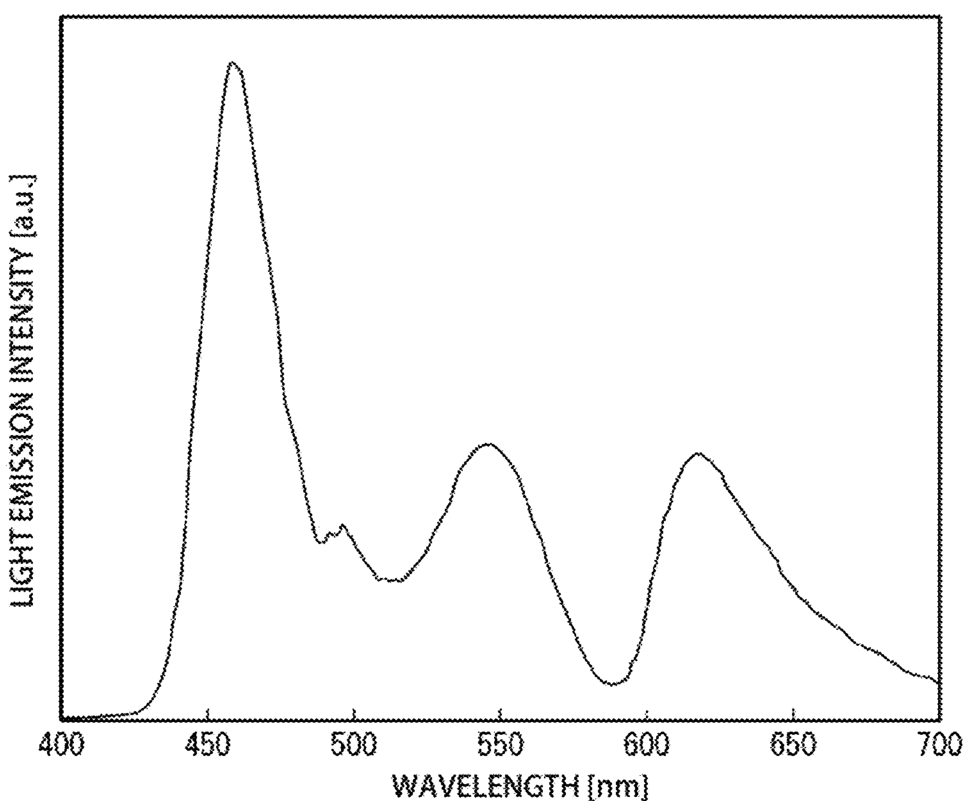
FIG. 9 is a graph showing the spectrum of a white display output from an organic EL light source and through a color filter used in the examples of the present invention.
Figure 10:
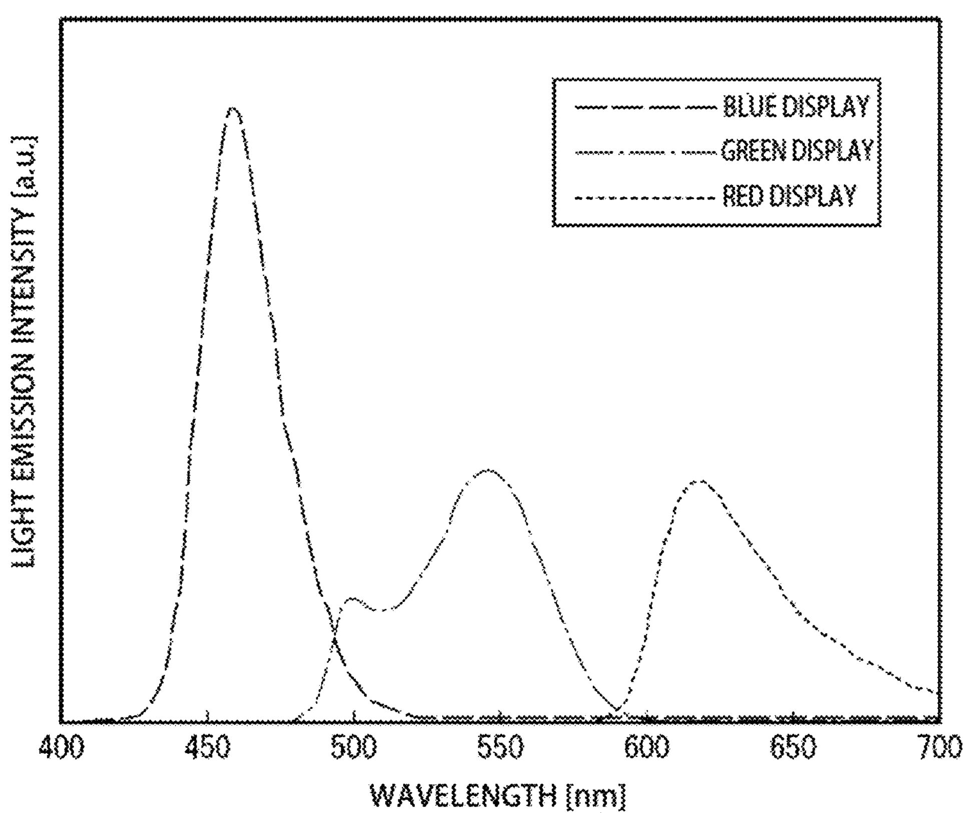
FIG. 10 is a graph showing the spectra during red, green, and blue displays output from the organic EL light source and through color filter used in the examples of the present invention.

The transmittance of the obtained optical films was measured using the automatic spectrophotometer (U-4100 manufactured by Hitachi, Ltd.), and the red display, green display, and blue display spectra of FIG. 10 output from the white EL light source and through the color filter having the spectrum shown in FIG. 9 was measured. The vertical axis of the graphs in FIGS. 9 and 10 indicates emission intensity [arbitrary unit (a.u.)]. The National Television Broadcast Standards Committee (NTSC) ratio was calculated from the CIE 1931 chromaticity value calculated using the measured transmittance and the red display, green display, and blue display spectra in FIG. 10. The NTSC ratio was evaluated as a metric of the color reproducibility. The higher the NTSC ratio, the better the color reproducibility.

As evaluations of the characteristics of the optical films, the ultraviolet shielding rates on the colored layer, and the results of the lightfastness test and the heat resistance test are shown in Tables 5 and 6. As evaluations of the characteristics of the display devices, the results of the white display transmission properties, display device reflection properties, and color reproducibility are shown in Tables 5 and 6. Regarding Comparative Example 5 having an optical film M that does not include a colored layer, since the measurement of the ultraviolet shielding rate on the colored layer, the lightfastness test, and the heat resistance test were not performed, "-" is shown in the corresponding cells in Table 6. In addition, the ratio of the white display transmission properties based on the white display transmission properties in Comparative Example 5 (Comparative Example 5 ratio), and the ratio of the display device reflection properties based on the display device reflection properties in Comparative Example 5 (Comparative Example 5 ratio) are shown in Tables 5 and 6, respectively.

TABLE 5

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| UV shielding rate of colored layer | | 92.9% | 92.9% | 92.9% | 92.9% | 92.9% | 90.5% | 92.9% | 92.9% |
| Lightfastness | ΔTλ1 | 12.9 | 9.2 | 7.1 | 7.3 | 7.0 | 8.5 | 6.5 | 7.5 |
| | ΔTλ2 | 2.6 | 1.9 | 1.6 | 1.8 | 1.5 | 2.1 | 1.2 | 1.5 |
| Heat resistance | ΔTλ1 | 8.7 | 9.6 | 8.5 | 8.5 | 8.6 | 8.5 | 8.1 | 8.5 |
| | ΔTλ2 | −0.5 | 1.0 | 1.2 | 1.1 | 1.0 | 0.9 | 0.8 | 1.2 |
| White display transmission properties | | 62.8 | 62.8 | 61.4 | 61.4 | 61.4 | 62.5 | 61.3 | 59.1 |
| | Ratio to Comp. Ex. 5 | 69% | 69% | 67% | 67% | 67% | 68% | 67% | 65% |
| Display device reflection properties | | 15.3 | 15.3 | 14.7 | 14.6 | 14.7 | 15.1 | 14.6 | 13.6 |
| | Ratio to Comp. Ex. 5 | 45% | 45% | 43% | 43% | 43% | 45% | 43% | 40% |
| Color reproducibility | NTSC ratio | 98.5% | 98.5% | 98.9% | 98.9% | 98.9% | 98.9% | 98.9% | 97.9% |

TABLE 6

| | | Comp. Ex. 1 | Comp. Ex. 2 | Comp. Ex. 3 | Comp. Ex. 4 | Comp. Ex. 5 |
|---|---|---|---|---|---|---|
| UV shielding rate of colored layer | | 92.9% | 92.9% | 92.9% | 7.2% | — |
| Lightfastness | ΔTλ1 | 22.1 | 20.4 | 20.8 | 49.1 | — |
| | ΔTλ2 | 4.8 | 3.8 | 4.6 | 29.5 | — |
| Heat resistance | ΔTλ1 | 29.8 | 25.2 | 24.6 | 29.8 | — |
| | ΔTλ2 | 0.3 | 0.4 | 0.5 | 0.3 | — |
| White display transmission properties | | 62.7 | 62.3 | 62.5 | 62.3 | 91.4 |
| | Ratio to Comp. Ex. 5 | 69% | 68% | 68% | 68% | 100% |
| Display device reflection properties | | 15.2 | 15.1 | 15.1 | 15.1 | 33.8 |
| | Ratio to Comp. Ex. 5 | 45% | 45% | 45% | 45% | 100% |
| Color reproducibility | NTSC ratio | 98.5% | 98.6% | 98.6% | 98.6% | 91.7% |

The results shown in Tables 5 and 6 indicate that the optical films (Examples 1 to 8) having a colored layer formed using the composition for forming the colored layer including the dye (A), ionizing radiation-curable resin (B), photoinitiator (C), and solvent (D) according to the present invention have good lightfastness and heat resistance. The optical films (Examples 3 to 8) having a colored layer of a composition for colored layer formation further containing a singlet oxygen quencher as an additive (E) have even better lightfastness. In addition, when a transparent substrate (Examples 1 to 5 and 7 to 8) or a functional layer (Example 6) having an ultraviolet absorbing ability that provides an ultraviolet shielding rate of 85% or higher was provided on the colored layer of the optical film, the lightfastness improved significantly as compared with when the colored layer did not have the ultraviolet absorbing ability (Comparative Example 4). When an oxygen barrier layer was provided on the colored layer of the present invention (Example 7), the lightfastness was further improved.

The reflection properties of the display devices having the colored layers according to the present invention decreased significantly (Examples 1 to 8). In addition, whereas it is said that the transmittance is halved when a circularly polarizing plate is used, it was confirmed that a high white display transmittance properties, good luminance efficiency, and improved color reproducibility are provided. This makes it possible to achieve both improved display characteristics and reliability.

The present invention will be described in more detail below with reference to Examples of the twelfth to twenty-first aspects of the present invention; however, the present invention should not be limited to these Examples.

Examples 1B to 11B, Comparative Examples 1B to 9B

In the above Examples and Comparative Examples, optical films A to T having the layered configurations shown in Tables 7 and 8 were prepared. Simulations were performed to evaluate the characteristics of the prepared films and their display device characteristics when used with an organic EL panel. In the tables, "-" means that the layer was not provided.

TABLE 7

| | Ex. 1B | Ex. 2B | Ex. 3B | Ex. 4B | Ex. 5B | Ex. 6B | Ex. 7B | Ex. 8B | Ex. 9B | Ex. 10B | Ex. 11B |
|---|---|---|---|---|---|---|---|---|---|---|---|
| Optical film | Optical film A | Optical film B | Optical film C | Optical film D | Optical film E | Optical film F | Optical film G | Optical film H | Optical film I | Optical film J | Optical film K |
| Functional layer 1 | Low refractive index layer | Low refractive index layer | Low refractive index layer | Low refractive index layer | Low refractive index layer | Low refractive index layer | Low refractive index layer | Low refractive index layer | Low refractive index layer | — | Low refractive index layer |
| Functional layer 2 | Hard coat layer 1 | Hard coat layer 1 | Hard coat layer 1 | Hard coat layer 1 | Hard coat layer 1 | Hard coat layer 1 | Hard coat layer 1 | Hard coat layer 2 | Hard coat layer 1 | Antiglare layer | Antiglare layer |
| Functional layer 3 | — | — | — | — | — | — | — | — | Oxygen barrier layer | — | — |
| Colored layer | — | — | — | — | — | — | — | Colored layer 3 | — | — | — |
| Transparent substrate | TAC | TAC | TAC | TAC | TAC | TAC | TAC | TAC | TAC | TAC | TAC |
| Colored layer | Colored layer 1 | Colored layer 2 | Colored layer 3 | Colored layer 4 | Colored layer 5 | Colored layer 6 | Colored layer 7 | — | Colored layer 3 | Colored layer 3 | Colored layer 3 |

TABLE 8

| | Comp. Ex. 1B | Comp. Ex. 2B | Comp. Ex. 3B | Comp. Ex. 4B | Comp. Ex. 5B | Comp. Ex. 6B | Comp. Ex. 7B | Comp. Ex. 8B | Comp. Ex. 9B |
|---|---|---|---|---|---|---|---|---|---|
| Optical film | Optical film L | Optical film M | Optical film N | Optical film O | Optical film P | Optical film Q | Optical film R | Optical film S | Optical film T |
| Functional layer 1 | Low refractive index layer | Low refractive index layer | Low refractive index layer | Low refractive index layer | Low refractive index layer | Low refractive index layer | Low refractive index layer | Low refractive index layer | Low refractive index layer |
| Functional layer 2 | Hard coat layer 1 | Hard coat layer 1 | Hard coat layer 1 | Hard coat layer 1 | Hard coat layer 1 | Hard coat layer 1 | Hard coat layer 1 | Hard coat layer 1 | Hard coat layer 1 |
| Functional layer 3 | — | — | — | — | — | — | — | — | — |
| Colored layer | — | — | Colored layer 10 | Colored layer 11 | Colored layer 12 | — | — | — | — |
| Transparent substrate | TAC | TAC | TAC | TAC | TAC | TAC | TAC | TAC | TAC |
| Colored layer | Colored layer 8 | Colored layer 9 | — | — | — | — | Colored layer 13 | Colored layer 14 | Colored layer 15 |

<Preparation of Optical Film>

How the layers were formed will be described.

The following substrate was used as the substrate.

A triacetyl cellulose film (TAC) (TG60UL manufactured by FUJIFILM Corporation, substrate thickness 60 μm, ultraviolet shielding rate 92.9%).

[Formation of Colored Layer]

(Materials of Composition for Forming Colored Layer)

The following materials were used for the composition for forming the colored layer.

Note that the wavelength of maximum absorption, the full width at half maximum, and the wavelength of minimum transmittance in a specified wavelength range of a colorant are its characteristic values in the state of a cured coating film.

<Dye (A)>

First Colorant

Dye-1:Pyrromethene cobalt complex dye (with a wavelength of maximum absorption of 493 nm and a full width at half maximum of 26 nm)

Second Colorant:

Dye-2: Tetraazaporphyrin copper complex dye (PD-311S manufactured by Yamamoto Chemicals Inc., with a wavelength of maximum absorption of 586 nm and a full width at half maximum of 22 nm)

Dye-3 Tetraazaporphyrin copper complex dye (FDG-007 manufactured by Yamada Chemical Co., Ltd., with a wavelength of maximum absorption of 595 nm and a full width at half maximum of 22 nm)

Third Colorant:

Dye-4 Phthalocyanine copper complex dye (FDN-002 manufactured by Yamada Chemical Co., Ltd., with a wavelength of minimum transmittance of 780 nm within 380 to 780 nm)

Colorants Other Than the First to Third Colorants

Dye-5: Dye (FDG-003 manufactured by Yamada Chemical Co., Ltd., with a wavelength of maximum absorption of 545 nm and a full width at half maximum of 79 nm)

Dye-6: Dye (FDG-004 manufactured by Yamada Chemical Co., Ltd., with a wavelength of maximum absorption of 575 nm and a full width at half maximum of 63 nm)

Manufacturing Example of Dye-1

After putting ethyl 5-formyl-2,4-dimethyl-1H-pyrrole-3-carboxylate (2.5 g) in a reaction vessel to dissolve it in methanol (50 mL), 47% hydrobromic acid (45 g) was added. The mixture was refluxed for 1 hour. By filtering the precipitated solid, 3,3',5,5'-tetramethyl-4,4'-di-ethoxycarbonyl-2,2'-dipyrromethene hydrobromide (2.6 g) was obtained.

After putting 3,3',5,5'-tetramethyl-4,4'-di-ethoxycarbonyl-2,2'-dipyrromethene hydrobromide (0.6 g) in a reaction vessel, methanol (5 mL), triethylamine (0.17 g), and cobalt acetate tetrahydrate (0.18 g) were added, and the mixture was refluxed for 2 hours. Dye-1 (0.42 g) was obtained by filtering the precipitated solid.

<Ionizing Radiation-Curable Resin (B)>

Resin (1): A resin (molecular weight 120,000) having an amine structure where, in the above formula (1), $R^1$ is $CH_3$, $R^2$ is $CH_3$, and X is a single bond.

Resin (2): A resin (molecular weight 51,500) having a phenol structure where, in the above formula (2), $R^3$ is $CH_3$, $R^4$ is H, and X is a single bond.

UA-306H: Pentaerythritol triacrylate hexamethylene diisocyanate urethane prepolymer (UA-306H manufactured by Kyoeisha Chemical Co., Ltd.).

DPHA: Dipentaerythritol hexaacrylate.

PETA: Pentaerythritol triacrylate.

Manufacturing Example of Resin (1)

2.4 g of 1,2,2,6,6-pentamethyl-4-piperidyl methacrylate (FA-711MM manufactured by Showa Denko Materials Co., Ltd.), 5.6 g of methyl methacrylate (manufactured by Kanto Chemical Co., Inc.), 31 g of cyclohexanone (manufactured by Kanto Chemical Co., Inc.), and 0.11 g of 2,2'-azobis (isobutyronitrile) (manufactured by FUJIFILM Wako Pure Chemical Corporation) were put in a reaction vessel and heated and stirred for 8 hours at 70° C. in a nitrogen gas atmosphere. After that, the mixture was heated and stirred for 1 hour at 100° C. to obtain a polymer solution. This polymer solution was poured into 400 mL of methanol (manufactured by Kanto Chemical Co., Inc.) and then filtered to collect the precipitate. By drying the precipitate, the resin 1 that is a copolymer of 1,2,2,6,6-pentamethyl-4-piperidyl methacrylate:methyl methacrylate=15:85 [mol %] was obtained.

Manufacturing Example of Resin (2)

2.4 g of 4-Hydroxyphenyl methacrylate (Shonol ARP-029P manufactured by Showa Denko K.K.), 5.6 g of methyl methacrylate (manufactured by Kanto Chemical Co., Inc.), 32 g of cyclohexanone (manufactured by Kanto Chemical Co., Inc.), and 0.11 g of 2,2'-azobis(isobutyronitrile) (manufactured by FUJIFILM Wako Pure Chemical Corporation) were put in a reaction vessel and heated and stirred for 8 hours at 70° C. in a nitrogen gas atmosphere. After that, the mixture was heated and stirred for 1 hour at 100° C. to obtain a polymer solution.

This polymer solution was poured into 400 mL of methanol (manufactured by Kanto Chemical Co., Inc.) and then filtered to collect the precipitate. By drying the precipitate, the resin 2 that is a copolymer of 4-hydroxyphenyl methacrylate:methyl methacrylate=19:81 [mol %] was obtained.

By additionally heating and stirring for an hour at 100° C., the initiator 2,2'-azobis(isobutyronitrile) can be completely decomposed. This suppresses deterioration of the optical film due to the remaining initiator.

By pouring the polymer solution into methanol, unreacted monomers, polymerization solvent, the products of the decomposition of the initiator, and the like can be removed, which suppresses deterioration of the optical film.

<Photoinitiator (C)>

An acyl phosphine oxide photoinitiator, Omnirad TPO, manufactured by IGM Resins B.V. was used.

<Solvent (D)>

Methyl ethyl ketone and methyl acetate were mixed as appropriate and used.

<Additive (E)>

A singlet oxygen ($1O_2$) quencher, bis(dibutyldithiocarbamic acid) nickel (II), D1781 manufactured by Tokyo Chemical Industry Co., Ltd.

A low-molecular-weight hindered amine photostabilizer (HALS), Tinuvin (registered trademark) 249, manufactured by BASF Japan Ltd. (molecular weight 482)

An (hydroxyphenyltriazine) ultraviolet absorber, Tinuvin (registered trademark) 479, manufactured by BASF Japan Ltd.

(Formation of Colored Layer)

The compositions for forming colored layers shown in Table 9 were each applied onto one surface of a substrate, and dried in an oven at 80° C. for 60 seconds. After that, the coating film was cured by irradiating it with ultraviolet light at an irradiation dose of 150 mJ/$cm^2$ using an ultraviolet irradiation device (a light source, H-bulb, manufactured by Fusion UV Systems Japan) to form colored layers 1 to 15. Note that the amount added is expressed in mass ratio (mass %). In the tables, "-" means that the component is not present.

TABLE 9

| | | Colored layer 1 | Colored layer 2 | Colored layer 3 | Colored layer 4 | Colored layer 5 | Colored layer 6 | Colored layer 7 | Colored layer 8 |
|---|---|---|---|---|---|---|---|---|---|
| Dye (A) | First colorant | | Dye-1 | | — | Dye-1 | | Dye-1 | |
| | Amount added | 0.2% | 0.2% | 0.2% | — | 0.1% | | 0.2% | |
| | Second colorant | | — | | Dye-2 | — | | — | |
| | Amount added | | — | | 0.2% | — | | — | |
| | Third colorant | | — | | — | Dye-4 | | — | |
| | Amount added | | — | | — | 1.5% | | — | |
| | Other colorants | | — | | — | — | | — | |
| | Amount added | | — | | — | — | | — | |
| Ionizing radiation-curable resin (B) | Type | Resin 1/UA-306H/DPHA/PETA | Resin 1/Resin 2/UA-306H/DPHA/PETA | | Resin 1/Resin 2/UA-306H/DPHA/PETA | | | UA-306H/DPHA/PETA | |
| | Ratio | 10/59/17/8 | | | 10/20/45/13/6 | | | 70/20/10 | |
| | Amount added | 45.2% | 45.2% | 43.8% | 43.8% | 42.4% | 45.2% | 42.3% | 42.0% |
| Photoinitiator (C) | Type | | | | Omnirad TPO | | | | |
| | Amount added | | | | 4.6% | | | | |
| Solvent (D) | Type | | | | MEK/Methyl acetate | | | | |
| | Ratio | | | | 50/50 | | | | |
| | Amount added | | | | 50% | | | | |
| Additive (E) | Type | — | | D1781 | D1781 | D1781 | — | Tinuvin 249 | Tinuvin 479/LA36 |
| | Ratio | — | | 100 | 100 | 100 | — | 100 | 40/60 |
| | Amount added | — | | 1.4% | 1.4% | 1.4% | — | 2.9% | 3.20% |

| | | Colored layer 9 | Colored layer 10 | Colored layer 11 | Colored layer 12 | Colored layer 13 | Colored layer 14 | Colored layer 15 |
|---|---|---|---|---|---|---|---|---|
| Dye (A) | First colorant | | — | | Dye-1 | Dye-1 | — | — |
| | Amount added | | — | | 0.1% | 0.2% | — | — |
| | Second colorant | | Dye-2 | | — | Dye-3/Dye-2 = 60/40 | — | — |
| | Amount added | | 0.2% | | — | 0.5% | — | — |
| | Third colorant | | — | | Dye-4 | — | — | — |
| | Amount added | | — | | 1.5% | — | — | — |
| | Other colorants | | — | | — | — | Dye-5 | Dye-6 |
| | Amount added | | — | | — | — | 0.2% | 0.2% |
| Ionizing radiation-curable resin (B) | Type | | | | UA-306H/DPHA/PETA | | | |
| | Ratio | | | | 70/20/10 | | | |
| | Amount added | 45.2% | 42.3% | 42.0% | 43.8% | 44.7% | 45.2% | 45.2% |
| Photoinitiator (C) | Type | | | | Omnirad TPO | | | |
| | Amount added | | | | 4.6% | | | |
| Solvent (D) | Type | | | | MEK/Methyl acetate | | | |
| | Ratio | | | | 50/50 | | | |
| | Amount added | | | | 50% | | | |
| Additive (E) | Type | — | Tinuvin 249 | Tinuvin 479/LA36 | | — | | |
| | Ratio | — | 100 | 40/60 | | — | | |
| | Amount added | — | 2.9% | 3.20% | | — | | |

[Formation of Functional Layer: Oxygen Barrier Layer]

(Composition for Forming Oxygen Barrier Layer)

Polyvinyl alcohol (PVA) resin for binders, 80 mass % aqueous solution of Kuraray Poval (registered trademark) PVA-117 (manufactured by Kuraray Co., Ltd.).

(Formation of Oxygen Barrier Layer)

The above composition for forming an oxygen barrier layer was applied to the transparent substrate of Example 9B shown in Table 7, and dried to form an oxygen barrier layer having an oxygen permeability of 1 $cm^3/(m^2 \cdot day \cdot atm)$.

[Formation of Functional Layer: Hard Coat Layer]

(Materials of Composition for Forming Hard Coat Layer)

The following materials were used for the composition for forming the hard coat layer.

Ionizing Radiation-Curable Resin

UA-306H: Pentaerythritol triacrylate hexamethylene diisocyanate urethane prepolymer (UA-306H manufactured by Kyoeisha Chemical Co., Ltd.).

DPHA: Dipentaerythritol hexaacrylate.

PETA: Pentaerythritol triacrylate.

Photoinitiator

Omnirad TPO: An acyl phosphine oxide photoinitiator (manufactured by IGM Resins B.V.).

Additive (Ultraviolet (UV) Absorber)

Tinuvin 479: A hydroxyphenyltriazine ultraviolet absorber, Tinuvin (registered trademark) 479 (manufactured by BASF Japan Ltd.).

LA-36: A benzotriazole ultraviolet absorber, ADK STAB (registered trademark) LA-36 (manufactured by ADEKA CORPORATION).

Solvent

MEK: Methyl ethyl ketone.

Methyl Acetate (Formation of Hard Coat Layer)

The compositions for forming hard coat layers shown in Table 10 were applied onto the transparent substrates, oxygen barrier layer, or colored layers shown in Tables 7 and 8, and dried in an oven at 80° C. for 60 seconds. After that, the coating film was cured by irradiating it with ultraviolet light at an irradiation dose of 150 $mJ/cm^2$ using an ultraviolet irradiation device (a light source, H-bulb, manufactured by Fusion UV Systems Japan) so that a hard coat layer having a film thickness of 5.0 μm after curing is formed. Note that the amount added is expressed in mass ratio (mass %).

In the tables, "-" means that the component is not present.

TABLE 10

| | | Hard coat layer 1 | Hard coat layer 2 |
|---|---|---|---|
| Ionizing radiation-curable resin (B) | Type | UA-306H/DPHA/PETA | |
| | Ratio | 70/20/10 | |
| | Amount added | 45.4% | 42.2% |
| Photoinitiator | Type | Omnirad TPO | |
| | Amount added | 4.6% | |
| UV absorber | Type | — | Tinuvin 479/LA36 |
| | Ratio | — | 40/60 |
| | Amount added | — | 3.2% |
| Solvent | Type | MEK/Methyl acetate | |
| | Ratio | 50/50 | |
| | Amount added | 50% | |

[Formation of Functional Layer: Antiglare Layer]

(Composition for Forming Antiglare Layer)

The following materials were used for the composition for forming the antiglare layer.

Ionizing Radiation-Curable Resin

A pentaerythritol triacrylate, Light Acrylate PE-3A (manufactured by Kyoeisha Chemical Co., Ltd., refractive index 1.52) 43.7 parts by mass.

Photoinitiator

Omnirad TPO (manufactured by IGM Resins B.V.) 4.55 parts by mass.

Resin Particles

Styrene-methyl methacrylate copolymer particles (refractive index 1.515, average particle size 2.0 μm) 0.5 part by mass.

Fine Inorganic Particles

Synthetic smectite 0.25 parts by mass.

Alumina nanoparticles (average particle size 40 nm) 1.0 parts by mass.

Solvent

Toluene 15 parts by mass.

Isopropyl alcohol 35 parts by mass.

The above composition for forming an antiglare layer was applied onto a transparent substrate shown in Table 7, and dried in an oven at 80° C. for 60 seconds. After that, the coating film was cured by irradiating it with ultraviolet light at an irradiation dose of 150 $mJ/cm^2$ using an ultraviolet irradiation device (a light source, H-bulb, manufactured by Fusion UV Systems Japan) so that an antiglare layer having a film thickness of 5.0 μm after curing is formed.

(Formation of Functional Layer: Low Refractive Index Layer)

(Composition for Forming the Low Refractive Index Layer)

The following materials were used for the composition for forming the low refractive index layer.

Refractive Index Modifier:

A dispersion of fine, porous silica particles (average particle size 75 nm, solid content 20%, methyl isobutyl ketone solvent) 8.5 parts by mass Antifouling Agent:

Optool AR-110 (manufactured by Daikin Industries, Ltd., solid content 15%, methyl isobutyl ketone solvent) 5.6 parts by mass Ionizing Radiation-Curable Resin:

Pentaerythritol triacrylate 0.4 parts by mass

Initiator:

Omnirad 184 (manufactured by IGM Resins B.V.) 0.07 parts by mass

Leveling Agent:

RS-77 (manufactured by DIC Corporation) 1.7 parts by mass

Solvent:

Methyl ethyl ketone 83.73 parts by mass (Formation of Low Refractive Index Layer)

The above composition for forming the low refractive index layer was applied to the hard coat layers or antiglare layers shown in Tables 7 and 8, and dried in an oven at 80° C. for 60 seconds. After that, each of the coating films was cured by irradiating it with ultraviolet light at an irradiation dose of 200 $mJ/cm^2$ using an ultraviolet irradiation device (a light source, H-bulb, manufactured by Fusion UV Systems Japan) so that a low refractive index layer having a film thickness of 100 nm after curing is formed.

[Evaluation of Film Characteristics]

The following evaluations were performed on each optical film sample.

<Ultraviolet Shielding Rate of Layers Above Colored Layer>

When the transparent substrate was used as a layer above the colored layer, the transmittance was measured using an automatic spectrophotometer (U-4100 manufactured by Hitachi, Ltd.). When the colored layer was provided above the substrate, the layers above the colored layer were peeled off using a transparent pressure-sensitive adhesive tape that satisfies the JIS-K5600-5-6:1999 adhesion test. Then, using an adhesive tape as a reference, the transmittance of the layers above the colored layer was measured with the automatic spectrophotometer (U-4100 manufactured by Hitachi, Ltd.). These transmittance values were used to calculate the average transmittance [%] in the ultraviolet region (290 nm to 400 nm), and the UV shielding rate [%] was obtained by subtracting the average transmittance [%] in the ultraviolet region (290 nm to 400 nm) from 100%.

(Lightfastness Test)

The films were tested using a xenon weather meter testing machine (X75 manufactured by Suga Test Instruments Co., Ltd.) for 120 hours with a xenon lamp illuminance of 60 $W/cm^2$ (300 to 400 nm) and at a temperature of 45° C. and humidity (RH) of 50% inside the testing machine. Using the automatic spectrophotometer (U-4100 manufactured by Hitachi, Ltd.), the transmittance was measured before and after the test to calculate, for each of the first to third ranges described above, a transmittance difference $\Delta T$ between before and after the test at a wavelength $\lambda$ at which the minimum transmittance was obtained before the test within the corresponding one of the first to third ranges. The closer the transmittance difference is to zero, the better.

(Heat Resistance Test)

Each of the optical film samples was stored at 90° C. for 500 hours. Using the automatic spectrophotometer (U-4100 manufactured by Hitachi, Ltd.), the transmittance was measured before and after the storage to calculate, for each of the first to third ranges described above, a transmittance difference $\Delta T$ between before and after the test at a wavelength $\lambda$ at which the minimum transmittance was obtained before the test within that range. The closer the transmittance difference is to zero, the better.

[Evaluation of Display Device Characteristics]

Simulations were performed as follows to evaluate the characteristics of display devices provided with the obtained optical films C, F, G, and Q to T. In the simulations, the display devices had a configuration in which the optical film is bonded to an organic EL display device (target object).

Figure 12:
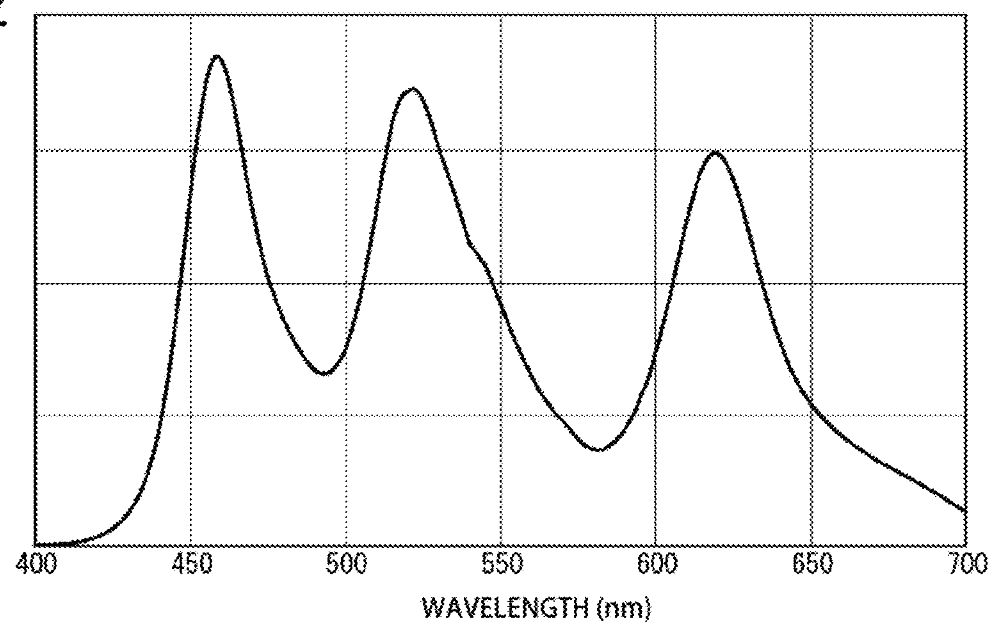
FIG. 12 is a spectrum of a light source used to evaluate the transmission properties of the examples of the present invention.
Figure 13:
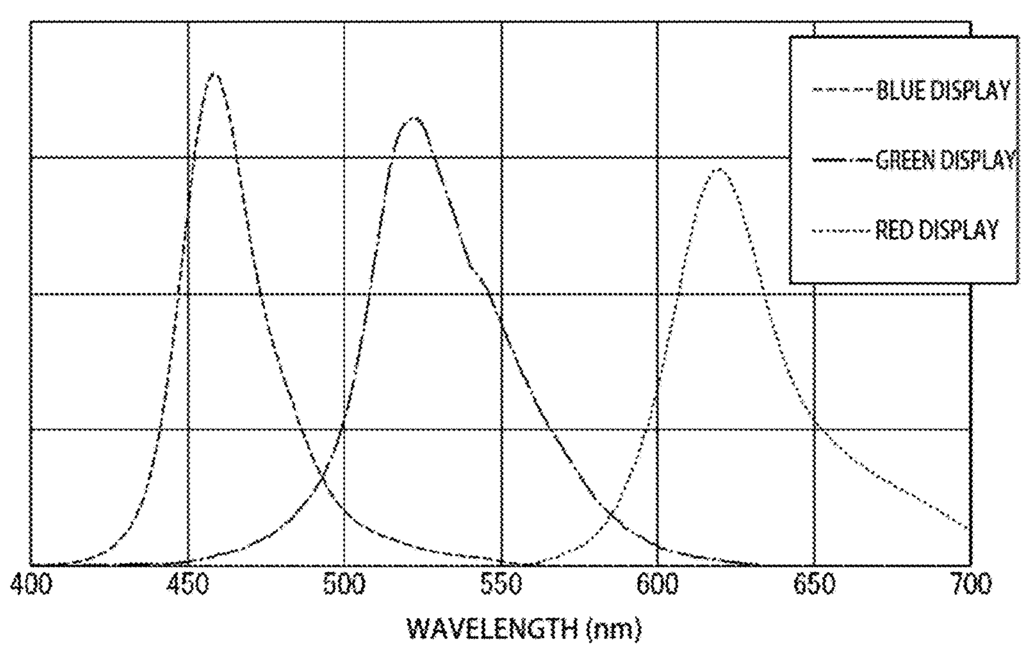
FIG. 13 is a spectrum of a light source used to evaluate the color reproducibility of the examples of the present invention.

Note that the organic EL display device, which is the target object to which the optical film is bonded, has a spectrum as shown in FIG. 12 during the white display, and individual spectra as shown in FIG. 13 during the red, green, and blue displays.

(White Display Properties)

The transmittance of each of the obtained optical films was measured using the automatic spectrophotometer (U-4100 manufactured by Hitachi, Ltd.). This transmittance of the optical film was multiplied by the individual spectrum during the white display of the EL display device without the optical film (see FIG. 12) to calculate the spectrum after passing through the optical film. After multiplying each of the individual spectrum of the organic EL display device during the white display and the spectrum after passing through the optical film by the luminous efficiency to calculate their Y values, the ratio between the Y values was determined assuming that the Y value obtained from the individual spectrum during the white display of the organic EL display device is 100. The determined ratio was assumed as the efficiency and used as a metric of the transmission properties of the display device.

(Color Reproducibility)

The transmittance of each of the obtained optical films was measured using the automatic spectrophotometer (U-4100 manufactured by Hitachi, Ltd.). Each of the individual spectra in the red, green, and blue displays of the organic EL display device without the optical film (see FIG. 13) was multiplied by this transmittance of the optical film to calculate the chromaticity (x, y) for each of monochromatic red, green, and blue in the Commission internationale de l'eclairage (CIE) 1931 color space after passing through the optical film. By comparison with each of the triangle obtained by connecting the obtained chromaticities for monochromatic red, green, and blue, and the triangle obtained by connecting the three primary colors of DCI-P3 proposed by the Digital Cinema Initiatives (DCI), i.e., red (x=0.680, y=0.320), green (x=0.265, y=0.690), and blue (x=0.150, y=0.060) to determine the overlap area, the coverage was calculated for each standard and used as a metric of color reproducibility.

As evaluations of the optical film characteristics of the optical films A to P shown in Tables 7 and 8, the results of the ultraviolet shielding rate measurement for layers above the colored layer, the light resistance test, and the heat resistance test are shown in Tables 11 and 12. Further, as evaluations of the characteristics of the display devices having the optical films C, F, G, and Q to T, their white display properties and color reproducibility are shown in Table 13.

TABLE 11

| | | Ex. 1B | Ex. 2B | Ex. 3B | Ex. 4B | Ex. 5B | Ex. 6B | Ex. 7B | Ex. 8B | Ex. 9B | Ex. 10B | Ex. 11B |
|---|---|---|---|---|---|---|---|---|---|---|---|---|
| UV shielding rate of colored layer | | 92.9% | 92.9% | 92.9% | 92.9% | 92.9% | 92.9% | 92.9% | 90.5% | 92.9% | 92.9% | 92.9% |
| Lightfastness | ΔT | 12.9 | 9.2 | 7.1 | 2.6 | 1.9 | 1.6 | 9.8 | 9.7 | 6.1 | 9.8 | 9.7 |
| Heat resistance | ΔT | 8.7 | 9.6 | 8.5 | −0.5 | 1.0 | 1.2 | 7.7 | 9.8 | 6.2 | 9.5 | 9.6 |

TABLE 12

| | | Comp. Ex. 1B | Comp. Ex. 2B | Comp. Ex. 3B | Comp. Ex. 4B | Comp. Ex. 5B |
|---|---|---|---|---|---|---|
| UV shielding rate of colored layer | | 92.9% | 92.9% | 7.2% | 7.2% | 7.2% |
| Lightfastness | ΔT | 22.1 | 20.4 | 49.1 | 29.5 | 17.8 |
| Heat resistance | ΔT | 29.8 | 25.2 | 29.8 | 0.3 | 8 |

performance by imparting one or both of water repellency and oil repellency. Examples of the antifouling layer include layers containing antifouling agents such as silicon oxide, fluorine-containing silane compounds, fluoroalkylsilazane, fluoroalkylsilane, fluorine-containing silicon compounds, and perfluoropolyether group-containing silane coupling agents.

The antifouling layer may be provided on the outermost surface of the functional layer, or an antifouling agent may

TABLE 13

| | | Ex. 3B Display device 1 | Ex. 6B Display device 2 | Ex. 7B Display device 3 | Comp. Ex. 6B Display device 4 | Comp. Ex. 7B Display device 5 | Comp. Ex. 8B Display device 6 | Comp. Ex. 9B Display device 7 |
|---|---|---|---|---|---|---|---|---|
| Optical film | | Optical film C | Optical film F | Optical film G | Optical film Q | Optical film R | Optical film S | Optical film T |
| Wavelength at maximum absorption (T < 50%) | | 493 nm | 595 nm | 780 nm | — | 493 nm 589 nm | 545 nm | 575 nm |
| Transmittance at wavelength of maximum absorption (T < 50%) | | 26.3% | 23.2% | 11.2% | — | 26.3% 19.5% | 48.1% | 48.4% |
| White display properties | | 75 | 77 | 70 | 92 | 61 | 75 | 73 |
| Color reproducibility | DCI coverage | 92% | 90% | 91% | 88% | 94% | 88% | 89% |

be added to the outermost layer of the functional layer(s) so that it functions as the antifouling layer.

The results shown in Tables 11 and 12 indicate that the optical films (Examples 1B to 10B) having a colored layer formed using the composition for forming the colored layer including the dye (A), ionizing radiation-curable resin (B), photoinitiator (C), and solvent (D) according to the present invention have good lightfastness and heat resistance. The optical films having a colored layer of a composition for colored layer formation further containing a singlet oxygen quencher as an additive (E) have even better lightfastness. In addition, when a transparent substrate or a functional layer having an ultraviolet absorbing ability that provides an ultraviolet shielding rate of 85% or higher was provided on the colored layer of the optical film, the lightfastness improved significantly as compared with when the colored layer did not have the ultraviolet absorbing ability. When an oxygen barrier layer was provided on the colored layer of the present invention, the lightfastness was further improved.

The results in Table 13 indicate that the display devices 1, 2, and 3 having the optical films according to Examples of the present invention have better color reproducibility than the display device 4 to which an optical film without a colored layer is applied. Compared to the display device 5 to which an optical film having a colored layer with a transmittance below 50% within two of the first to third ranges is applied, the white display properties are significantly improved, and a better balance with the color reproducibility was found.

Compared to the display device 6 to which an optical film having a colored layer with an absorption wavelength band different from the wavelength range of the present invention is applied, the balance between the white display properties and the color reproducibility was still better.

While an embodiment and examples of the present invention have been described, the specific configurations are not limited to the above embodiment. Various modifications and combinations of the configurations can be made without departing from the principle of the present invention.

For example, the antiglare layer may be provided with ultraviolet absorbing ability to further enhance lightfastness.

The antifouling layer may be included in the functional layer. The antifouling layer can improve the antifouling The antistatic layer may be included in the functional layer. Examples of the antistatic layer include layers containing antistatic agents such as fine metal oxide particles such as antimony-doped tin oxide (ATO) and tin-doped indium oxide (ITO), polymeric conductive compositions, and quaternary ammonium salts.

The antistatic layer may be provided on the outermost surface of the functional layer or between the functional layer and the transparent substrate. Alternatively, an antistatic agent may be added to one of the above-described layers constituting the functional layer so that it functions as the antistatic layer. When an antistatic layer is provided, the optical film preferably has a surface resistance of $1.0\times10^6$ to $1.0\times10^{12}$ (Ω/cm).

INDUSTRIAL APPLICABILITY

According to the present invention, a composition for forming a colored layer, an optical film, and a display device capable of improving lightfastness and heat resistance, achieving both reflection suppression and luminance efficiency, improving display quality, extending the life of the light emitting elements, and improving color reproducibility can be provided.

The present invention can be applied to an optical film used in a display device.

REFERENCE SIGNS LIST

1, 2, 3, 4, 5, 6, 7, 8 . . . Optical film; 10 . . . Colored layer; 20 . . . Transparent substrate; 30 . . . Functional layer; 31 . . . Low refractive index layer; 32 . . . Hard coat layer; 33 . . . Oxygen barrier layer; 34 . . . Antiglare layer.

What is claimed is:

1. A composition for forming a colored layer, comprising:

a dye (A), an ionizing radiation-curable resin (B), a photoinitiator (C), and a solvent (D), wherein the dye (A) contains a first colorant and a second colorant, the first colorant has a wavelength of maximum absorption in a range of 470 nm to 530 nm, and an absorption spectrum with a full width at half maximum of 15 nm to 45 nm, the second colorant has a wavelength of maximum absorption in a range of 560 nm to 620 nm, and an absorption spectrum with a full width at half maximum of 15 nm to 55 nm, and the ionizing radiation-curable resin (B) contains a resin having an amine structure.

2. The composition for forming the colored layer of claim 1, wherein the ionizing radiation-curable resin (B) is a polymer containing a structural unit represented by following formula (1),

[Chemical Formula 1]

(1)

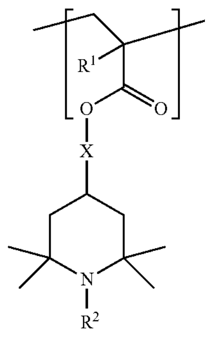

[where $R^1$ represents a hydrogen atom, halogen atom, carboxyl group, sulfo group, cyano group, hydroxy group, alkyl group having 10 or fewer carbon atoms, alkoxycarbonyl group having 10 or fewer carbon atoms, alkylsulfonylaminocarbonyl group having 10 or fewer carbon atoms, arylsulfonylaminocarbonyl group, alkylsulfonyl group, arylsulfonyl group, acylaminosulfonyl group having 10 or fewer carbon atoms, alkoxy group having 10 or fewer carbon atoms, alkylthio group having 10 or fewer carbon atoms, aryloxy group having 10 or fewer carbon atoms, nitro group, alkoxycarbonyloxy group, aryloxycarbonyloxy group, acyloxy group having 10 or fewer carbon atoms, acyl group having 10 or fewer carbon atoms, carbamoyl group, sulfamoyl group, aryl group having 10 or fewer carbon atoms, substituted amino group, substituted ureido group, substituted phosphono group, or a heterocyclic group; $R^2$ represents a hydrogen atom or an alkyl group having 30 or fewer carbon atoms; and X represents a single bond, an ester group, an aliphatic alkyl chain having 30 or fewer carbon atoms, an aromatic chain, a polyethylene glycol chain, or a linking group formed by combination thereof, and any of these may contain a spirodioxane ring].

3. The composition for forming the colored layer of claim 1, wherein the ionizing radiation-curable resin (B) further contains a polymer having a structural unit represented by following formula (2),

[Chemical Formula 2]

(2)

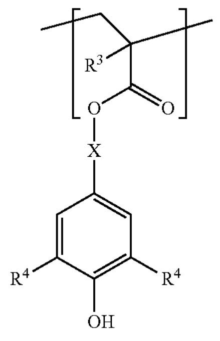

[where $R^3$ represents a hydrogen atom, halogen atom, carboxyl group, sulfo group, cyano group, hydroxy group, alkyl group having 10 or fewer carbon atoms, alkoxycarbonyl group having 10 or fewer carbon atoms, alkylsulfonylaminocarbonyl group having 10 or fewer carbon atoms, arylsulfonylaminocarbonyl group, alkylsulfonyl group, arylsulfonyl group, acylaminosulfonyl group having 10 or fewer carbon atoms, alkoxy group having 10 or fewer carbon atoms, alkylthio group having 10 or fewer carbon atoms, aryloxy group having 10 or fewer carbon atoms, nitro group, alkoxycarbonyloxy group, aryloxycarbonyloxy group, acyloxy group having 10 or fewer carbon atoms, acyl group having 10 or fewer carbon atoms, carbamoyl group, sulfamoyl group, aryl group having 10 or fewer carbon atoms, substituted amino group, substituted ureido group, substituted phosphono group, or a heterocyclic group; $R^4$ represents a hydrogen atom or an alkyl group having 30 or fewer carbon atoms; and X represents a single bond, an ester group, an aliphatic alkyl chain having 30 or fewer carbon atoms, an aromatic chain, a polyethylene glycol chain, or a linking group formed by combination thereof, and any of these may contain a spirodioxane ring].

4. The composition for forming the colored layer of claim 1, further comprising one or more additives (E) selected from a radical scavenger, a peroxide decomposer, and a singlet oxygen quencher.

5. The composition for forming the colored layer of claim 4, wherein the singlet oxygen quencher is a dialkyl phosphate, dialkyldithiocarbamate, or benzenedithiol, or a transition metal complex thereof.

6. The composition for forming the colored layer of claim 1, wherein the dye (A) contains one or more selected from the group consisting of compounds having a porphyrin structure, merocyanine structure, phthalocyanine structure, azo structure, cyanine structure, squarylium structure, coumarin structure, polyene structure, quinone structure, tetradiporphyrin structure, pyrromethene structure, and indigo structure; and a metal complex thereof.

7. The composition for forming the colored layer of claim 1, wherein the dye (A) further contains a third colorant whose wavelength of lowest transmittance within a wavelength range of 380 nm to 780 nm is within a range of 650 nm to 780 nm.

8. An optical film, comprising:

a colored layer that is a cured product of the composition for forming the colored layer of claim 1;

a transparent substrate located on one surface of the colored layer; and a functional layer located on one or the other surface of the colored layer, wherein one or both of the transparent substrate and the functional layer have an ultraviolet shielding rate of 85% or higher as measured according to a method described in JIS L 1925, and the functional layer functions as an antireflection layer or an antiglare layer.

9. The optical film of claim 8, further comprising an oxygen barrier layer having an oxygen permeability of 10 $cm^3/(m^2 \cdot day \cdot atm)$ or lower as the functional layer.

10. The optical film of claim 8, further comprising an antistatic layer or an antifouling layer as the functional layer.

11. A display device comprising the optical film of claim 8.

12. A composition for forming a colored layer, comprising:

a dye (A), an ionizing radiation-curable resin (B), a photoinitiator (C), and a solvent (D), wherein the dye (A) contains at least one of a first colorant having a wavelength of maximum absorption in a first range of 470 nm to 530 nm, and an absorption spectrum with a full width at half maximum of 15 nm to 45 nm, a second colorant having a wavelength of maximum absorption in a second range of 560 nm to 620 nm, and an absorption spectrum with a full width at half maximum of 15 nm to 55 nm, and a third colorant whose wavelength of minimum transmittance within a wavelength range of 380 nm to 780 nm is within a third range of 650 nm or higher and 780 nm or lower, minimum transmittance is 1% or higher and lower than 50% in only one of the first to third ranges, and the ionizing radiation-curable resin (B) contains a resin having an amine structure.

13. The composition for forming the colored layer of claim 12, wherein the ionizing radiation-curable resin (B) is a polymer containing a structural unit represented by following formula (1),

[Chemical Formula 3]

(1)

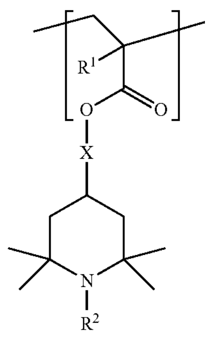

[where $R^1$ represents a hydrogen atom, halogen atom, carboxyl group, sulfo group, cyano group, hydroxy group, alkyl group having 10 or fewer carbon atoms, alkoxycarbonyl group having 10 or fewer carbon atoms, alkylsulfonylaminocarbonyl group having 10 or fewer carbon atoms, arylsulfonylaminocarbonyl group, alkylsulfonyl group, arylsulfonyl group, acylaminosulfonyl group having 10 or fewer carbon atoms, alkoxy group having 10 or fewer carbon atoms, alkylthio group having 10 or fewer carbon atoms, aryloxy group having 10 or fewer carbon atoms, nitro group, alkoxycarbonyloxy group, aryloxycarbonyloxy group, acyloxy group having 10 or fewer carbon atoms, acyl group having 10 or fewer carbon atoms, carbamoyl group, sulfamoyl group, aryl group having 10 or fewer carbon atoms, substituted amino group, substituted ureido group, substituted phosphono group, or a heterocyclic group; $R^2$ represents a hydrogen atom or an alkyl group having 30 or fewer carbon atoms; and X represents a single bond, an ester group, an aliphatic alkyl chain having 30 or fewer carbon atoms, an aromatic chain, a polyethylene glycol chain, or a linking group formed by combination thereof, and any of these may contain a spirodioxane ring].

14. The composition for forming the colored layer of claim 12, wherein the ionizing radiation-curable resin (B) further contains a polymer having a structural unit represented by following formula (2),

[Chemical Formula 4]

(2)

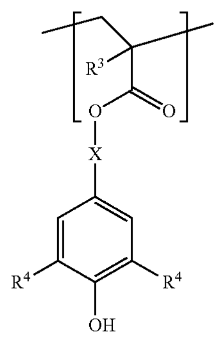

[where $R^3$ represents a hydrogen atom, halogen atom, carboxyl group, sulfo group, cyano group, hydroxy group, alkyl group having 10 or fewer carbon atoms, alkoxycarbonyl group having 10 or fewer carbon atoms, alkylsulfonylaminocarbonyl group having 10 or fewer carbon atoms, arylsulfonylaminocarbonyl group, alkylsulfonyl group, arylsulfonyl group, acylaminosulfonyl group having 10 or fewer carbon atoms, alkoxy group having 10 or fewer carbon atoms, alkylthio group having 10 or fewer carbon atoms, aryloxy group having 10 or fewer carbon atoms, nitro group, alkoxycarbonyloxy group, aryloxycarbonyloxy group, acyloxy group having 10 or fewer carbon atoms, acyl group having 10 or fewer carbon atoms, carbamoyl group, sulfamoyl group, aryl group having 10 or fewer carbon atoms, substituted amino group, substituted ureido group, substituted phosphono group, or a heterocyclic group; $R^4$ represents a hydrogen atom or an alkyl group having 30 or fewer carbon atoms; and X represents a single bond, an ester group, an aliphatic alkyl chain having 30 or fewer carbon atoms, an aromatic chain, a polyethylene glycol chain, or a linking group formed by combination thereof, and any of these may contain a spirodioxane ring].

15. The composition for forming the colored layer of claim 12, further comprising one or more additives (E) selected from a radical scavenger, a peroxide decomposer, and a singlet oxygen quencher.

16. The composition for forming the colored layer of claim 15, wherein the singlet oxygen quencher is a dialkyl phosphate, dialkyldithiocarbamate, or benzenedithiol, or a transition metal complex thereof.

17. The composition for forming the colored layer of claim 12, wherein the dye (A) contains one or more selected from the group consisting of compounds having a porphyrin structure, merocyanine structure, phthalocyanine structure, azo structure, cyanine structure, squarylium structure, coumarin structure, polyene structure, quinone structure, tetradiporphyrin structure, pyrromethene structure, and indigo structure; and a metal complex thereof.

18. An optical film, comprising:

a colored layer that is a cured product of the composition for forming the colored layer of claim 12;

a transparent substrate located on one surface of the colored layer; and a functional layer located on one or the other surface of the colored layer, wherein one or both of the transparent substrate and the functional layer have an ultraviolet shielding rate of 85% or higher as measured according to a method described in JIS L 1925, and the functional layer functions as an antireflection layer or an antiglare layer.

19. The optical film of claim 18, further comprising an oxygen barrier layer having an oxygen permeability of 10 $cm^3/(m^2\cdot day\cdot atm)$ or lower as the functional layer.

20. The optical film of claim 18, further comprising an antistatic layer or an antifouling layer as the functional layer.

21. A display device comprising the optical film of claim 18.

* * * * *